(12) United States Patent
Khlat et al.

(10) Patent No.: US 8,570,913 B2
(45) Date of Patent: Oct. 29, 2013

(54) DE-MULTIPLEXING A RADIO FREQUENCY INPUT SIGNAL USING OUTPUT TRANSFORMER CIRCUITRY

(75) Inventors: Nadim Khlat, Cugnaux (FR); Ruediger Bauder, Feldkirchen-Westerham (DE); Andrew F. Folkmann, Cedar Rapids, IA (US)

(73) Assignee: RF Micro Devices, Inc., Greensboro, NC (US)

( * ) Notice: Subject to any disclaimer, the term of this patent is extended or adjusted under 35 U.S.C. 154(b) by 478 days.

(21) Appl. No.: 12/966,707

(22) Filed: Dec. 13, 2010

(65) Prior Publication Data

US 2011/0310775 A1 Dec. 22, 2011

Related U.S. Application Data

(60) Provisional application No. 61/285,782, filed on Dec. 11, 2009.

(51) Int. Cl.
*H04B 7/005* (2006.01)
*H04B 7/00* (2006.01)
*H04B 1/04* (2006.01)
*H04L 12/50* (2006.01)

(52) U.S. Cl.
USPC ............ 370/278; 370/310; 370/359; 455/103

(58) Field of Classification Search
USPC ........................... 370/278, 310, 359; 455/103
See application file for complete search history.

(56) References Cited

U.S. PATENT DOCUMENTS

| | | | | |
|---|---|---|---|---|
| 7,343,138 B2 * | 3/2008 | Bengtson et al. | ............ | 455/103 |
| 2008/0117894 A1 * | 5/2008 | McMorrow | .................. | 370/359 |
| 2011/0310775 A1 | 12/2011 | Khlat et al. | | |

OTHER PUBLICATIONS

Aoki, I. et al., "A fully-integrated 1.8-V, 2.8-W, 1.9-GHz, CMOS Power Amplifier," IEEE Radio Frequency Integrated Circuits Symposium, Jun. 2003, pp. 199-202.
An, K. et al., "Power-combining transformer techniques for fully-integrated CMOS power amplifiers," IEEE Journal of Solid-State Circuits, vol. 43, No. 5, May 2008, pp. 1034-1075.
Jang, J. et al., "A CMOS RF power amplifier using an off-chip transmission line transformer with 62% PAE," IEEE Microwave and Wireless Components Letters, vol. 17, No. 5, May 2007, pp. 385-387.
Lee, H. et al., "A quasi-four-pair class-E CMOS RF power amplifier with an integrated passive device transformer," IEEE Transactions on Microwave Theory and Techniques, vol. 57, No. 4, Apr. 2009, pp. 752-759.

(Continued)

*Primary Examiner* — Ian N Moore
*Assistant Examiner* — Kiet Tang
(74) *Attorney, Agent, or Firm* — Withrow & Terranova, P.L.L.C.

(57) ABSTRACT

The present disclosure relates to de-multiplexing at least one RF input signal feeding RF power amplifier circuitry to create multiple de-multiplexed RF output signals, which may be used to provide RF transmit signals in an RF communications system. Output transformer circuitry is coupled to outputs from the RF power amplifier circuitry to provide the de-multiplexed RF output signals, which may support multiple modes, multiple frequency bands, or both. The de-multiplexed RF output signals may be used in place of RF switching elements in certain embodiments. As a result, RF front-end switching circuitry in the RF communications system may be simplified, thereby reducing insertion losses, reducing costs, reducing size, or any combination thereof. Additionally, the output transformer circuitry may provide load line transformation, output transistor biasing, or both to the RF power amplifier circuitry.

21 Claims, 18 Drawing Sheets

(56) References Cited

OTHER PUBLICATIONS

Park, C. et al., "Tournament-shaped magnetically coupled power-combiner architecture for RF CMOS power amplifier," IEEE Transactions on Microwave Theory and Techniques, vol. 55, No. 10, Oct. 2007, pp. 2064-2042.

Park, C. et al., "A 1/9-GHz CMOS power amplifier using three-port asymmetric transmission line transformer for a polar transmitter," IEEE Transactions on Microwave Theory and Techniques, vol. 55, No. 2, Feb. 2007, pp. 230-238.

* cited by examiner

DE-MULTIPLEXING A RADIO FREQUENCY INPUT SIGNAL USING OUTPUT TRANSFORMER CIRCUITRY

This application claims the benefit of provisional patent application Ser. No. 61/285,782, filed Dec. 11, 2009, the disclosure of which is hereby incorporated herein by reference in its entirety.

FIELD OF THE DISCLOSURE

Embodiments of the present disclosure relate to output transformer circuitry coupled to outputs from radio frequency (RF) power amplifier circuitry, both of which may be used in wireless communications systems.

BACKGROUND OF THE DISCLOSURE

As wireless communications technologies evolve, wireless communications systems become increasingly sophisticated. Multi-mode and multi-band wireless systems are routinely available. Such systems may include circuit elements to support multiple modes, multiple frequency bands, or both. Typical multi-mode communications systems may communicate using at least one of two different modes of operation. The first mode, called half duplex, is a two-way mode of operation, in which a first transceiver communicates with a second transceiver; however, only one transceiver transmits at a time. Therefore, the transmitter and receiver in a transceiver do not operate simultaneously. For example, certain telemetry systems operate in a send-then-wait-for-reply manner. Many time division duplex (TDD) systems operate using a half duplex mode.

The second mode, called full duplex, is a simultaneous two-way mode of operation, in which a first transceiver communicates with a second transceiver, and both transceivers may transmit simultaneously; therefore, the transmitter and receiver in a transceiver must be capable of operating simultaneously. In a full duplex transceiver, signals from the transmitter must not interfere with signals received by the receiver; therefore, transmitted signals are at transmit frequencies that are different from received signals, which are at receive frequencies. Many frequency division duplex (FDD) systems operate using a full duplex mode.

As a result of the differences between full duplex operation and half duplex operation, RF front end circuitry may need specific circuitry for each mode. As a result, the RF front end circuitry may need separate signals for each mode. Additionally, support of multiple frequency bands may require specific circuitry for each frequency band or for certain groupings of frequency bands. As a result, the RF front end circuitry may need separate signals based on which frequency bands are in use. In order to reduce size and cost, and increase performance and efficiency, multi-mode and multi-band wireless systems need to support multiple modes, multiple bands, or both in a way to reduce size, cost, and insertion losses. Thus, there is a need for a wireless system that can effectively generate the separate signals needed for multi-mode operation, multi-band operation, or both.

SUMMARY OF THE EMBODIMENTS

The present disclosure relates to de-multiplexing at least one RF input signal feeding RF power amplifier circuitry to create multiple de-multiplexed RF output signals, which may be used to provide RF transmit signals in an RF communications system. Output transformer circuitry is coupled to outputs from the RF power amplifier circuitry to provide the de-multiplexed RF output signals, which may support multiple modes, multiple frequency bands, or both. The de-multiplexed RF output signals may be used in place of RF switching elements in certain embodiments. As a result, RF front-end switching circuitry in the RF communications system may be simplified, thereby reducing insertion losses, reducing costs, reducing size, or any combination thereof. Additionally, the output transformer circuitry may provide load line transformation, output transistor biasing, or both to the RF power amplifier circuitry.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION OF THE PREFERRED EMBODIMENTS

The embodiments set forth below represent the necessary information to enable those skilled in the art to practice the disclosure and illustrate the best mode of practicing the disclosure. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to de-multiplexing at least one RF input signal feeding RF power amplifier circuitry to create multiple de-multiplexed RF output signals, which may be used to provide RF transmit signals in an RF communications system. Output transformer circuitry is coupled to outputs from the RF power amplifier circuitry to provide the de-multiplexed RF output signals, which may support multiple modes, multiple frequency bands, or both. The de-multiplexed RF output signals may be used in place of RF switching elements in certain embodiments. As a result, RF front-end switching circuitry in the RF communications system may be simplified, thereby reducing insertion losses, reducing costs, reducing size, or any combination thereof. Additionally, the output transformer circuitry may provide load line transformation, output transistor biasing, or both to the RF power amplifier circuitry.

Figure 1:
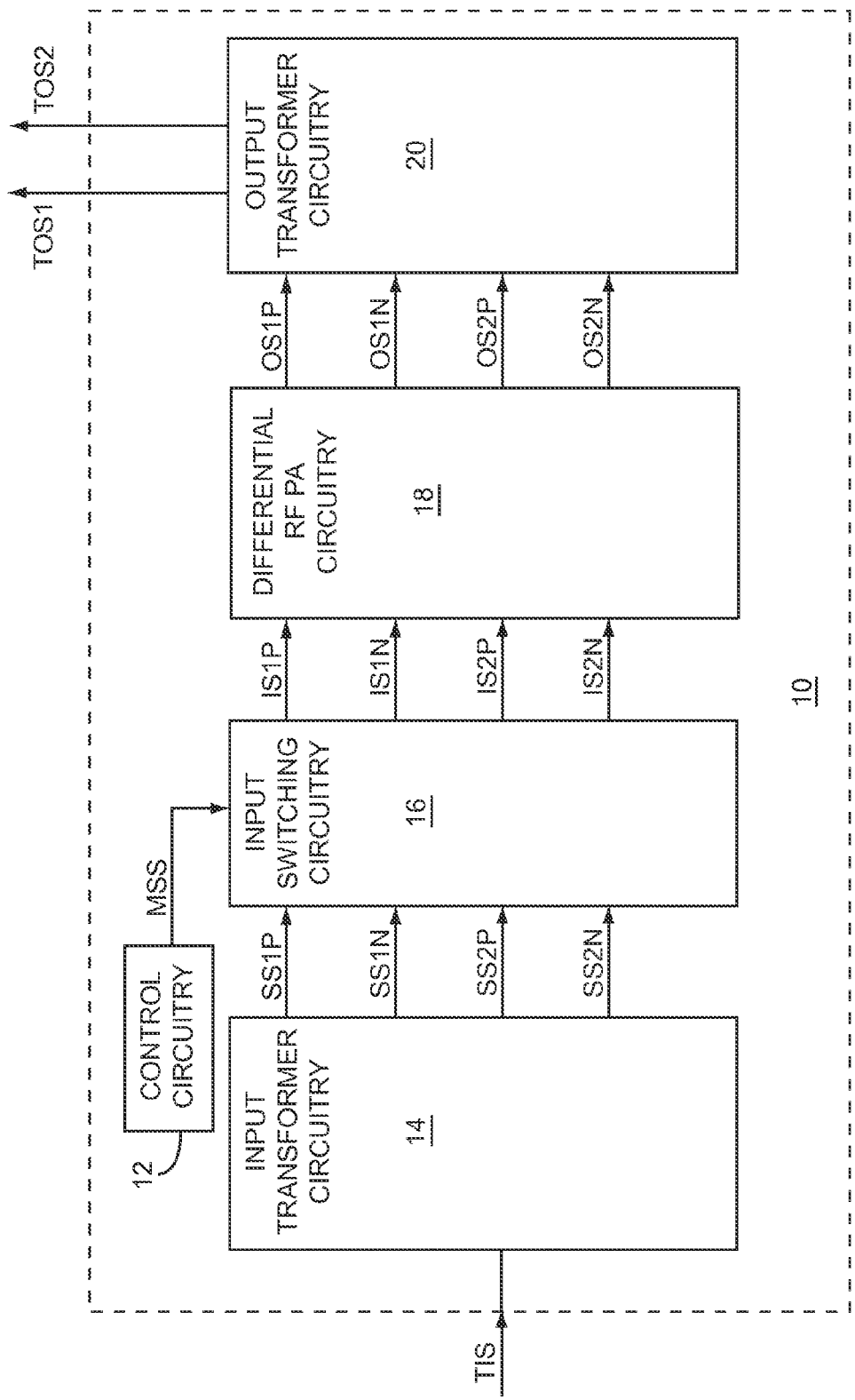
FIG. 1 shows RF circuitry according to one embodiment of the RF circuitry.

FIG. 1 shows RF circuitry 10 according to one embodiment of the RF circuitry 10. The RF circuitry 10 includes control circuitry 12, input transformer circuitry 14, input switching circuitry 16, differential RF power amplifier circuitry 18, and output transformer circuitry 20. During operation, the control circuitry 12 may select one of multiple operating modes, which may include a first operating mode and a second operating mode. The control circuitry 12 provides a mode select signal MSS to the input switching circuitry 16. The mode select signal MSS may be indicative of which of the multiple operating modes is selected. In general, the mode select signal MSS is based on which of the multiple operating modes is selected.

The input transformer circuitry 14 receives and splits a transformer input signal TIS to provide a first differential RF switching signal and a second differential RF switching signal to the input switching circuitry 16. The first differential RF switching signal includes a first positive-side RF switching signal SS1P and a first negative-side RF switching signal SS1N, and the second differential RF switching signal includes a second positive-side RF switching signal SS2P and a second negative-side RF switching signal SS2N. The first positive-side RF switching signal SS1P may be phase-shifted about 180 degrees from the first negative-side RF switching signal SS1N and the second positive-side RF switching signal SS2P may be phase-shifted about 180 degrees from the second negative-side RF switching signal SS2N. In one embodiment of the RF circuitry 10, the transformer input signal TIS is a single-ended signal. In an alternate embodiment of the RF circuitry 10, the transformer input signal TIS is a differential signal. The input transformer circuitry 14 may split the power provided by the transformer input signal TIS to provide the first differential RF switching signal and the second differential RF switching signal. As such, the power provided by the first differential RF switching signal may be about equal to the power provided by the second differential RF switching signal. The input transformer circuitry 14 may be used to provide load line transformation.

The input switching circuitry 16 receives and forwards the first differential RF switching signal to provide a first differential RF input signal based on the mode select signal MSS, and the input switching circuitry 16 receives and forwards the second differential RF switching signal to provide a second differential RF input signal based on the mode select signal MSS. The first differential RF input signal includes a first positive-side RF input signal IS1P and a first negative-side RF input signal IS1N, and the second differential RF input signal includes a second positive-side RF input signal IS2P and a second negative-side RF input signal IS2N. The first positive-side RF input signal IS1P may be phase-shifted from the first negative-side RF input signal IS1N by about 180 degrees and the second positive-side RF input signal IS2P may be phase-shifted from the second negative-side RF input signal IS2N by about 180 degrees.

Depending on the mode select signal MSS, the input switching circuitry 16 may receive and forward the first positive-side RF switching signal SS1P to provide the first positive-side RF input signal IS1P, and receive and forward the first negative-side RF switching signal SS1N to provide the first negative-side RF input signal IS1N. Alternatively, depending on the mode select signal MSS, the input switching circuitry 16 may receive and forward the first positive-side RF switching signal SS1P to provide the first negative-side RF input signal IS1N, and receive and forward the first negative-side RF switching signal SS1N to provide the first positive-side RF input signal IS1P.

Similarly, depending on the mode select signal MSS, the input switching circuitry 16 may receive and forward the second positive-side RF switching signal SS2P to provide the second positive-side RF input signal IS2P, and receive and forward the second negative-side RF switching signal SS2N to provide the second negative-side RF input signal IS2N. Alternatively, depending on the mode select signal MSS, the input switching circuitry 16 may receive and forward the second positive-side RF switching signal SS2P to provide the second negative-side RF input signal IS2N, and receive and forward the second negative-side RF switching signal SS2N to provide the second positive-side RF input signal IS2P. In general, the first differential RF input signal and the second differential RF input signal are based on splitting the transformer input signal TIS.

The differential RF power amplifier circuitry 18 receives and amplifies the first differential RF input signal to provide a first differential RF output signal, and receives and amplifies the second differential RF input signal to provide a second differential RF output signal. The first differential RF output signal includes a first positive-side RF output signal OS1P and a first negative-side RF output signal OS1N, and the second differential RF output signal includes a second positive-side RF output signal OS2P and a second negative-side RF output signal OS2N. The first positive-side RF output signal OS1P may be phase-shifted from the first negative-side RF output signal OS1N by about 180 degrees, and the second positive-side RF output signal OS2P may be phase-shifted from the second negative-side RF output signal OS2N by about 180 degrees.

The output transformer circuitry 20 receives and combines the first differential RF output signal and the second differential RF output signal to provide a first transformer output signal TOS1 and a second transformer output signal TOS2. In one embodiment of the RF circuitry 10, during the first operating mode, the first transformer output signal TOS1 is based on a combination of the first differential RF output signal and the second differential RF output signal that substantially reinforce one another, and the second transformer output signal TOS2 is based on a combination of the first differential RF output signal and the second differential RF output signal that substantially cancel one another. As such, the power provided by the first differential RF output signal and the power provided by the second differential RF output signal may substantially combine to provide the power provided by the first transformer output signal TOS1. Since the second transformer output signal TOS2 is based on the combination of the first differential RF output signal and the second differential RF output signal that substantially cancel one another, the power provided by the second transformer output signal TOS2 is about zero.

Further, in one embodiment of the RF circuitry 10, during the second operating mode, the first transformer output signal TOS1 is based on a combination of the first differential RF output signal and the second differential RF output signal that substantially cancel one another, and the second transformer output signal TOS2 is based on a combination of the first differential RF output signal and the second differential RF output signal that substantially reinforce one another. As such, the power provided by the first differential RF output signal and the power provided by the second differential RF output signal may substantially combine to provide the power provided by the second transformer output signal TOS2. Since the first transformer output signal TOS1 is based on the combination of the first differential RF output signal and the second differential RF output signal that substantially cancel one another, the power provided by the first transformer output signal TOS1 is about zero.

In one embodiment of the RF circuitry 10 the first transformer output signal TOS1 may be a single-ended signal and the second transformer output signal TOS2 may be a single-ended signal. In an alternate embodiment of the RF circuitry 10 the first transformer output signal TOS1 may be a differential signal and the second transformer output signal TOS2 may be a differential signal. In general, the transformer input signal TIS is de-multiplexed to provide the first transformer output signal TOS1 and the second transformer output signal TOS2 by using the input switching circuitry 16 to either swap or not swap the differential RF switching signals to provide the differential RF input signals. By de-multiplexing the transformer input signal TIS to provide the first transformer output signal TOS1 and the second transformer output signal TOS2, a single-pole double-throw (1P2T) switch may be eliminated, which would otherwise be needed, thereby reducing insertion loss, cost, space, or any combination thereof. The output transformer circuitry 20 may be used to provide load line transformation between the differential RF power amplifier circuitry 18 and downstream circuitry (not shown). Further, the output transformer circuitry 20 may be used to provide output transistor biasing of the differential RF power amplifier circuitry 18.

In other embodiments of the RF circuitry 10, the input transformer circuitry 14, the input switching circuitry 16, or both may be replaced with alternate circuitry. Any or all of the control circuitry 12, the input transformer circuitry 14, the input switching circuitry 16, the differential RF power amplifier circuitry 18, and the output transformer circuitry 20 may be provided by one or more semiconductor die. Further, any or all of the control circuitry 12, the input transformer circuitry 14, the input switching circuitry 16, the differential RF power amplifier circuitry 18, and the output transformer circuitry 20 may be provided by one or more interconnecting substrate between semiconductor dies. The interconnecting substrate may be a laminate.

Figure 2:
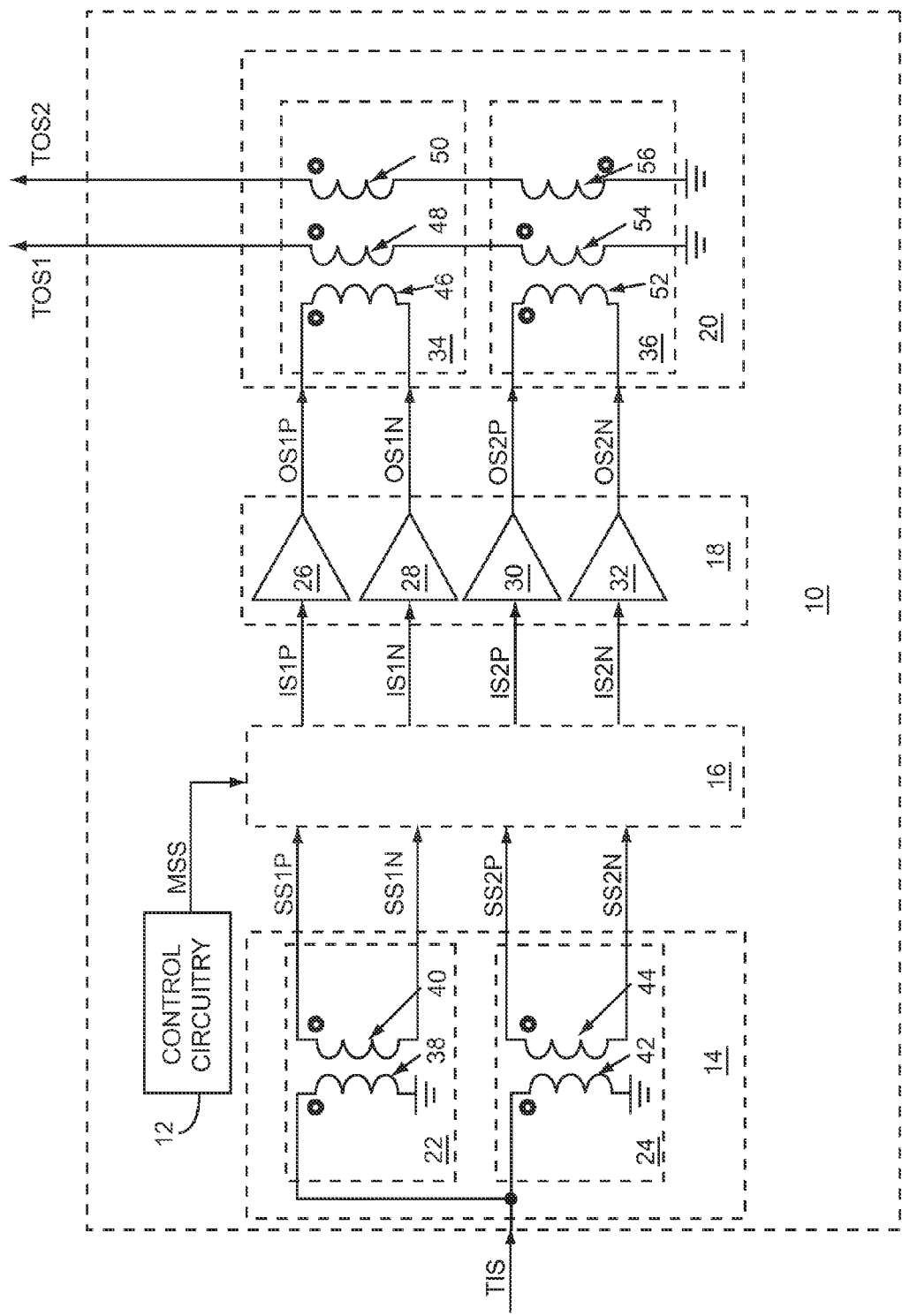
FIG. 2 shows details of input transformer circuitry, input switching circuitry, differential RF power amplifier circuitry, and output transformer circuitry illustrated in FIG. 1 according to one embodiment of the input transformer circuitry, the input switching circuitry, the differential RF power amplifier circuitry, and the output transformer circuitry.

FIG. 2 shows details of the input transformer circuitry 14, the input switching circuitry 16, the differential RF power amplifier circuitry 18, and the output transformer circuitry 20 illustrated in FIG. 1 according to one embodiment of the input transformer circuitry 14, the input switching circuitry 16, the differential RF power amplifier circuitry 18, and the output transformer circuitry 20. The input transformer circuitry 14 includes a first input transformer element 22 and a second input transformer element 24. The differential RF power amplifier circuitry 18 includes a first positive-side RF power amplifier 26, a first negative-side RF power amplifier 28, a second positive-side RF power amplifier 30, and a second negative-side RF power amplifier 32. The output transformer circuitry 20 includes a first output transformer element 34 and a second output transformer element 36.

The first input transformer element 22 includes a first input primary leg 38 and a first input secondary leg 40. The second input transformer element 24 includes a second input primary leg 42 and a second input secondary leg 44. The first output transformer element 34 includes a first output primary leg 46, a first output alpha secondary leg 48, and a first output beta secondary leg 50. The second output transformer element 36 includes a second output primary leg 52, a second output alpha secondary leg 54, and a second output beta secondary leg 56.

One end of the first input primary leg 38 is coupled to ground and an opposite end of the first input primary leg 38 receives the transformer input signal TIS. One end of the second input primary leg 42 is coupled to ground and an opposite end of the second input primary leg 42 receives the transformer input signal TIS. As such, the transformer input signal TIS is a single-ended signal and the power provided by the transformer input signal TIS is split between the first input transformer element 22 and the second input transformer element 24. The first input secondary leg 40 provides the first positive-side RF switching signal SS1P and the first negative-side RF switching signal SS1N. The first input transformer element 22 uses magnetic coupling, electrostatic coupling, or both between the first input primary leg 38 and first input secondary leg 40, such that the first input secondary leg 40 provides the first differential RF switching signal based on transforming the transformer input signal TIS. The phasing of the first input primary leg 38 and first input secondary leg 40 is such that the first positive-side RF switching signal SS1P is about phase-aligned with the transformer input signal TIS.

The second input secondary leg 44 provides the second positive-side RF switching signal SS2P and the second negative-side RF switching signal SS2N. The second input transformer element 24 uses magnetic coupling, electrostatic coupling, or both between the second input primary leg 42 and the second input secondary leg 44, such that the second input secondary leg 44 provides the second differential RF switching signal based on transforming the transformer input signal TIS. The phasing of the second input primary leg 42 and the second input secondary leg 44 is such that the second positive-side RF switching signal SS2P is about phase-aligned with the transformer input signal TIS.

The first positive-side RF power amplifier 26 receives and amplifies the first positive-side RF input signal IS1P to provide the first positive-side RF output signal OS1P. The first negative-side RF power amplifier 28 receives and amplifies the first negative-side RF input signal IS1N to provide the first negative-side RF output signal OS1N. The second positive-side RF power amplifier 30 receives and amplifies the second positive-side RF input signal IS2P to provide the second positive-side RF output signal OS2P. The second negative-side RF power amplifier 32 receives and amplifies the second negative-side RF input signal IS2N to provide the second negative-side RF output signal OS2N.

The first output primary leg 46 receives the first differential RF output signal and the second output primary leg 52 receives the second differential RF output signal. Specifically, one end of the first output primary leg 46 receives the first positive-side RF output signal OS1P and an opposite end of the first output primary leg 46 receives the first negative-side RF output signal OS1N. Further, one end of the second output primary leg 52 receives the second positive-side RF output signal OS2P and an opposite end of the second output primary leg 52 receives the second negative-side RF output signal OS2N.

One end of the first output alpha secondary leg 48 provides the first transformer output signal TOS1 and an opposite end of the first output alpha secondary leg 48 is coupled to one end of the second output alpha secondary leg 54. An opposite end of the second output alpha secondary leg 54 is coupled to ground. Similarly, one end of the first output beta secondary leg 50 provides the second transformer output signal TOS2 and an opposite end of the first output beta secondary leg 50 is coupled to one end of the second output beta secondary leg 56. An opposite end of the second output beta secondary leg 56 is coupled to ground. As such, the first output alpha secondary leg 48 and the second output alpha secondary leg 54 are coupled in series to provide the first transformer output signal TOS1, and the first output beta secondary leg 50 and the second output beta secondary leg 56 are coupled in series to provide the second transformer output signal TOS2. Therefore, in this embodiment, the first transformer output signal TOS1 and the second transformer output signal TOS2 are single-ended signals.

In this regard, the first output transformer element 34 uses magnetic coupling, electrostatic coupling, or both between the first output primary leg 46 and the first output secondary legs 48, 50, such that the first output alpha secondary leg 48 provides a portion of the first transformer output signal TOS1 based on transforming the first differential RF output signal and the first output beta secondary leg 50 provides a portion of the second transformer output signal TOS2 based on transforming the first differential RF output signal. Further, the second output transformer element 36 uses magnetic coupling, electrostatic coupling, or both between the second output primary leg 52 and the second output secondary legs 54, 56, such that the second output alpha secondary leg 54 provides a portion of the first transformer output signal TOS1 based on transforming the second differential RF output signal and the second output beta secondary leg 56 provides a portion of the second transformer output signal TOS2 based on transforming a portion of the second differential RF output signal.

Since the first output alpha secondary leg 48 and the second output alpha secondary leg 54 are coupled in series, the first transformer output signal TOS1 is about equal to the portion of the first transformer output signal TOS1 provided by the first output alpha secondary leg 48 added to the portion of the first transformer output signal TOS1 provided by the second output alpha secondary leg 54. The phasing of the first output primary leg 46 and the first output alpha secondary leg 48 is such that the portion of the first transformer output signal TOS1 provided by the first output alpha secondary leg 48 is about phase-aligned with the first positive-side RF output signal OS1P. The phasing of the second output primary leg 52 and the second output alpha secondary leg 54 is such that the portion of the first transformer output signal TOS1 provided by the second output alpha secondary leg 54 is about phase-aligned with the second positive-side RF output signal OS2P.

Since the first output beta secondary leg 50 and the second output beta secondary leg 56 are coupled in series, the second transformer output signal TOS2 is about equal to the portion of the second transformer output signal TOS2 provided by the first output beta secondary leg 50 added to the portion of the second transformer output signal TOS2 provided by the second output beta secondary leg 56. The phasing of the first output primary leg 46 and the first output beta secondary leg 50 is such that the portion of the second transformer output signal TOS2 provided by the first output beta secondary leg 50 is about phase-aligned with the first positive-side RF output signal OS1P. The phasing of the second output primary leg 52 and the second output beta secondary leg 56 is such that the portion of the second transformer output signal TOS2 provided by the second output beta secondary leg 56 is about phase-aligned with the second negative-side RF output signal OS2N.

Figure 3:
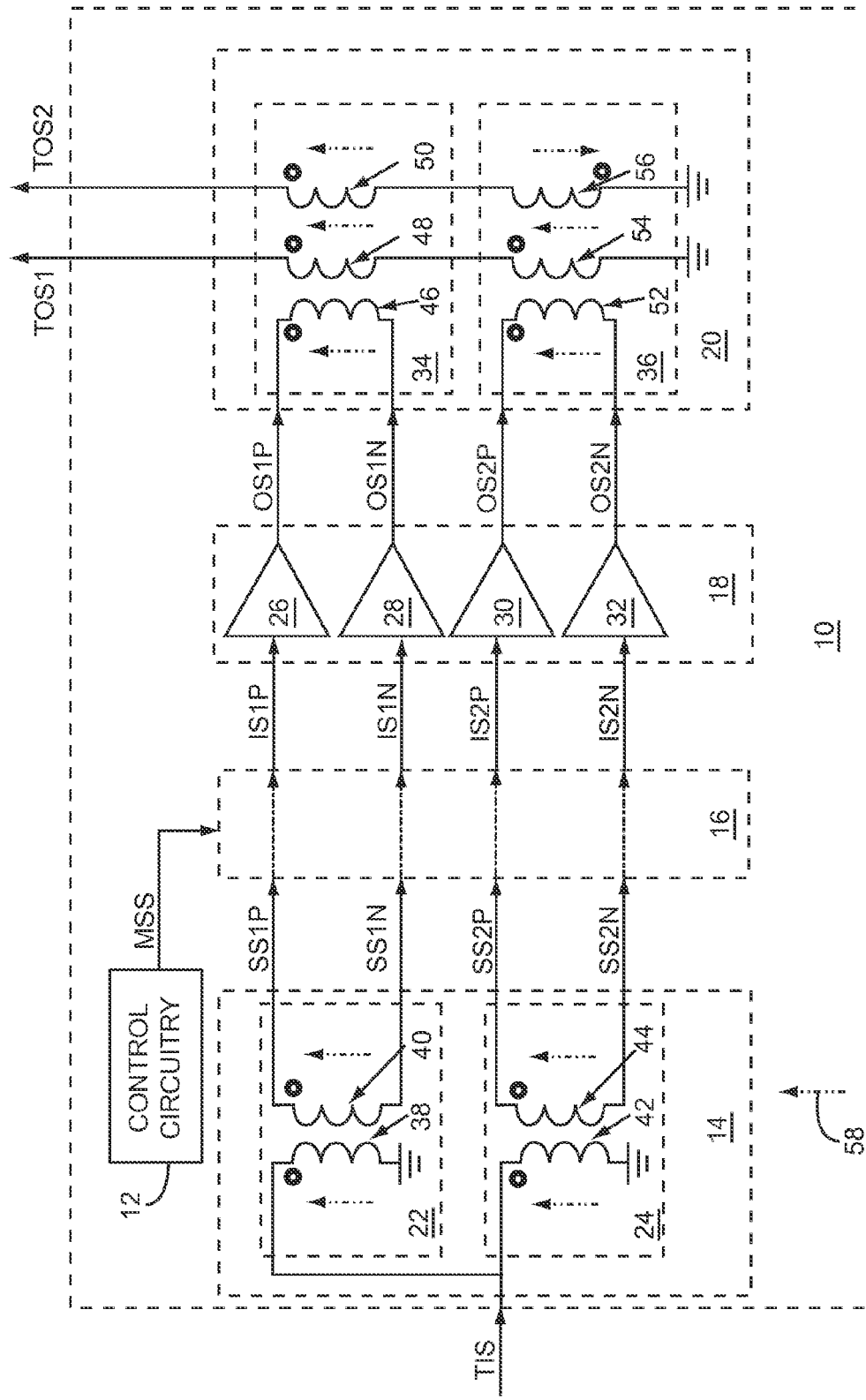
FIG. 3 shows details of the RF circuitry illustrated in FIG. 2 during a first operating mode of the RF circuitry.

FIG. 3 shows details of the RF circuitry 10 illustrated in FIG. 2 during the first operating mode of the RF circuitry 10. FIG. 3 includes polarity arrows 58 that show the relative phasing of the first input primary leg 38, the first input secondary leg 40, the second input primary leg 42, the second input secondary leg 44, the first output primary leg 46, the first output alpha secondary leg 48, the first output beta secondary leg 50, the second output primary leg 52, the second output alpha secondary leg 54, and the second output beta secondary leg 56. Further, FIG. 3 illustrates forwarding behavior of the input switching circuitry 16.

During the first operating mode, the input switching circuitry 16 is configured, based on the mode select signal MSS, to forward the first positive-side RF switching signal SS1P to provide the first positive-side RF input signal IS1P, to forward the first negative-side RF switching signal SS1N to provide the first negative-side RF input signal IS1N, to forward the second positive-side RF switching signal SS2P to provide the second positive-side RF input signal IS2P, and to forward the second negative-side RF switching signal SS2N to provide the second negative-side RF input signal IS2N.

As illustrated by the polarity arrows 58, the first positive-side RF switching signal SS1P is about phase-aligned with the transformer input signal TIS, and the second positive-side RF switching signal SS2P is about phase-aligned with the transformer input signal TIS. The first positive-side RF input signal IS1P and the first positive-side RF output signal OS1P are about phase-aligned with the first positive-side RF switching signal SS1P. Therefore, the first positive-side RF output signal OS1P is about phase-aligned with the transformer input signal TIS. The second positive-side RF input signal IS2P and the second positive-side RF output signal OS2P are about phase-aligned with the second positive-side RF switching signal SS2P. Therefore, the second positive-side RF output signal OS2P is about phase-aligned with the transformer input signal TIS.

Further, as illustrated by the polarity arrows 58, the portion of the first transformer output signal TOS1 provided by the first output alpha secondary leg 48 is about phase-aligned with first positive-side RF output signal OS1P, and the portion of the first transformer output signal TOS1 provided by the second output alpha secondary leg 54 is about phase-aligned with the second positive-side RF output signal OS2P. Since both the first positive-side RF output signal OS1P and the second positive-side RF output signal OS2P are about phase-aligned with the transformer input signal TIS, the portion of the first transformer output signal TOS1 provided by the first output alpha secondary leg 48 is about phase-aligned with the portion of the first transformer output signal TOS1 provided by the second output alpha secondary leg 54. As a result, the powers of the portions of the first transformer output signal TOS1 provided by the first output alpha secondary leg 48 and the second output alpha secondary leg 54 combine in a reinforcing manner to provide the first transformer output signal TOS1.

Additionally, as illustrated by the polarity arrows 58, the portion of the second transformer output signal TOS2 provided by the first output beta secondary leg 50 is about phase-aligned with first positive-side RF output signal OS1P, and the portion of the second transformer output signal TOS2 provided by the second output beta secondary leg 56 is about phase-aligned with the second negative-side RF output signal OS2N. Since both the first positive-side RF output signal OS1P and the second positive-side RF output signal OS2P are about phase-aligned with the transformer input signal TIS, the second negative-side RF output signal OS2N is phase-shifted from the transformer input signal TIS by about 180 degrees. As a result, the portion of the second transformer output signal TOS2 provided by the first output beta secondary leg 50 is phase-shifted from the portion of the second transformer output signal TOS2 provided by the second output beta secondary leg 56 by about 180 degrees. Therefore, the powers of the portions of the second transformer output signal TOS2 provided by the first output beta secondary leg 50 and the second output beta secondary leg 56 combine in a cancelling manner to provide the second transformer output signal TOS2, which would have a resulting power about equal to zero.

Figure 4:
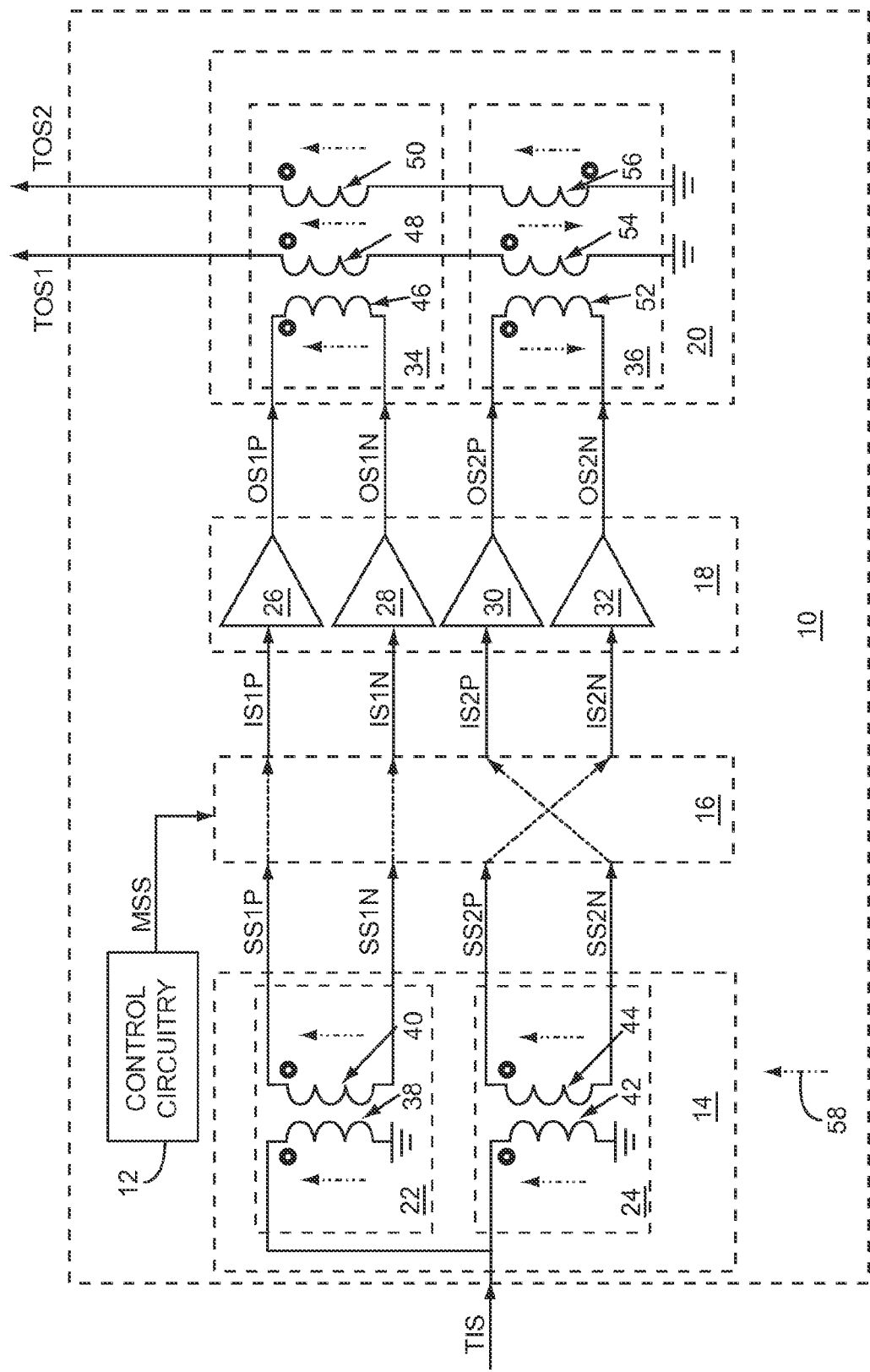
FIG. 4 shows details of the RF circuitry illustrated in FIG. 2 during a second operating mode of the RF circuitry.

FIG. 4 shows details of the RF circuitry 10 illustrated in FIG. 2 during the second operating mode of the RF circuitry 10. FIG. 4 includes the polarity arrows 58 that show the relative phasing of the first input primary leg 38, the first input secondary leg 40, the second input primary leg 42, the second input secondary leg 44, the first output primary leg 46, the first output alpha secondary leg 48, the first output beta secondary leg 50, the second output primary leg 52, the second output alpha secondary leg 54, and the second output beta secondary leg 56. Further, FIG. 4 illustrates the forwarding behavior of the input switching circuitry 16.

During the second operating mode, the input switching circuitry 16 is configured, based on the mode select signal MSS, to forward the first positive-side RF switching signal SS1P to provide the first positive-side RF input signal IS1P, to forward the first negative-side RF switching signal SS1N to provide the first negative-side RF input signal IS1N, to forward the second positive-side RF switching signal SS2P to provide the second negative-side RF input signal IS2N, and to forward the second negative-side RF switching signal SS2N to provide the second positive-side RF input signal IS2P.

As illustrated by the polarity arrows 58, the first positive-side RF switching signal SS1P is about phase-aligned with the transformer input signal TIS, and the second positive-side RF switching signal SS2P is about phase-aligned with the transformer input signal TIS. The first positive-side RF input signal IS1P and the first positive-side RF output signal OS1P are about phase-aligned with the first positive-side RF switching signal SS1P. Therefore, the first positive-side RF output signal OS1P is about phase-aligned with the transformer input signal TIS. The second negative-side RF input signal IS2N and the second negative-side RF output signal OS2N are about phase-aligned with the second positive-side RF switching signal SS2P. Therefore, the second negative-side RF output signal OS2N is about phase-aligned with the transformer input signal TIS.

Further, as illustrated by the polarity arrows 58, the portion of the first transformer output signal TOS1 provided by the first output alpha secondary leg 48 is about phase-aligned with the first positive-side RF output signal OS1P, and the portion of the first transformer output signal TOS1 provided by the second output alpha secondary leg 54 is about phase-aligned with the second negative-side RF output signal OS2N. Since both the first positive-side RF output signal OS1P and the second negative-side RF output signal OS2N are about phase-aligned with the transformer input signal TIS, the portion of the first transformer output signal TOS1 provided by the first output alpha secondary leg 48 is phase-shifted from the portion of the first transformer output signal TOS1 provided by the second output alpha secondary leg 54 by about 180 degrees. As a result, the powers of the portions of the first transformer output signal TOS1 provided by the first output alpha secondary leg 48 and the second output alpha secondary leg 54 combine in a cancelling manner to provide the first transformer output signal TOS1, which would have a resulting power equal to about zero.

Additionally, as illustrated by the polarity arrows 58, the portion of the second transformer output signal TOS2 provided by the first output beta secondary leg 50 is about phase-aligned with first positive-side RF output signal OS1P, and the portion of the second transformer output signal TOS2 provided by the second output beta secondary leg 56 is about phase-aligned with the second negative-side RF output signal OS2N. Since both the first positive-side RF output signal OS1P and the second negative-side RF output signal OS2N are about phase-aligned with the transformer input signal TIS, the portion of the second transformer output signal TOS2 provided by the first output beta secondary leg 50 is about phase-aligned with the portion of the second transformer output signal TOS2 provided by the second output beta secondary leg 56. Therefore, the powers of the portions of the second transformer output signal TOS2 provided by the first output beta secondary leg 50 and the second output beta secondary leg 56 combine in a reinforcing manner to provide the second transformer output signal TOS2.

Figure 5:
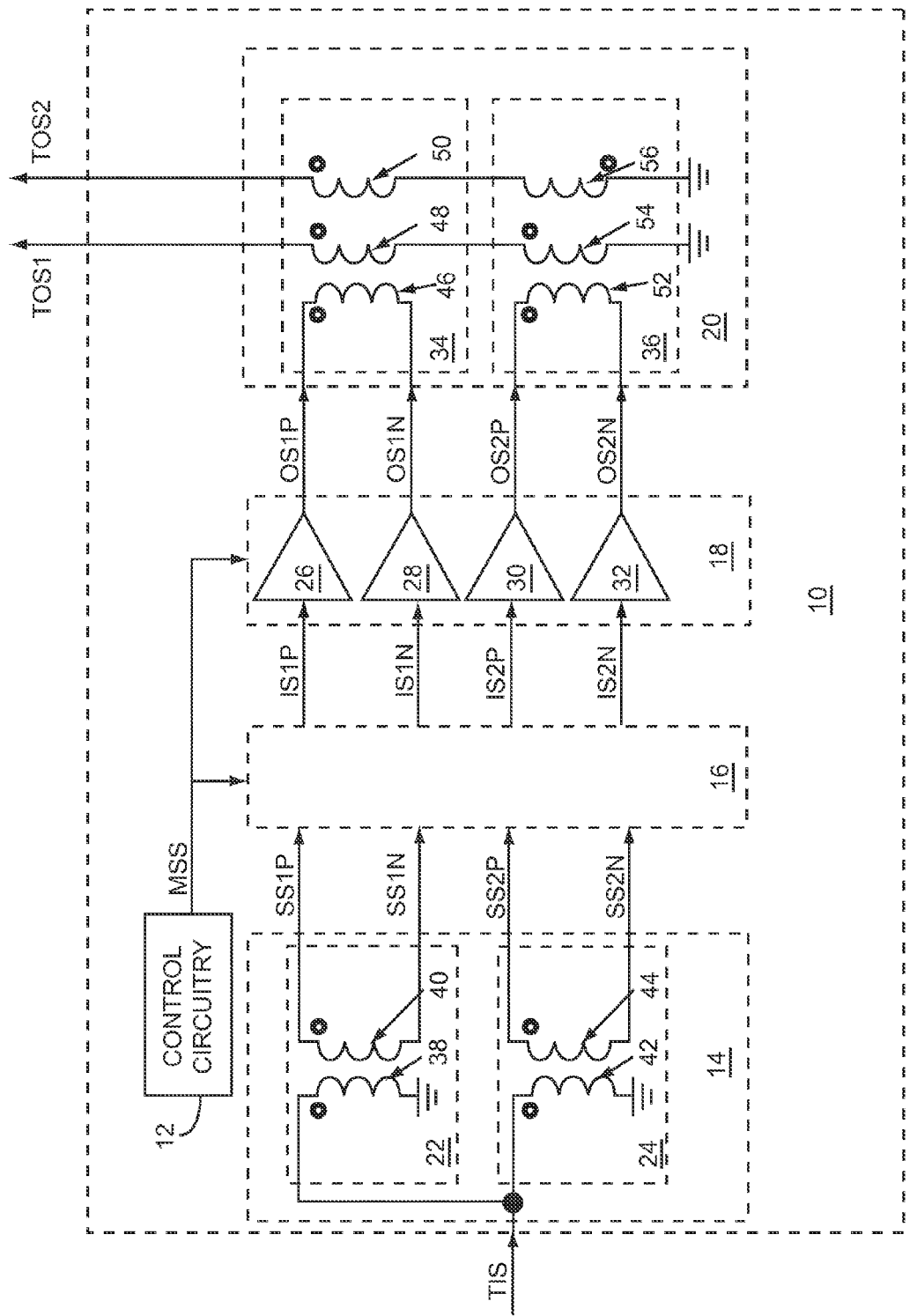
FIG. 5 shows the RF circuitry according to an alternate embodiment of the RF circuitry.

FIG. 5 shows the RF circuitry 10 according to an alternate embodiment of the RF circuitry 10. The RF circuitry 10 illustrated in FIG. 5 is similar to the RF circuitry 10 illustrated in FIG. 2, except in the RF circuitry 10 illustrated in FIG. 5, the control circuitry 12 provides the mode select signal MSS to both the input switching circuitry 16 and the differential RF power amplifier circuitry 18. During operation, the control circuitry 12 may select one of multiple operating modes, which may include the first operating mode, the second operating mode, and a reduced output power operating mode. During the first operating mode, the differential RF power amplifier circuitry 18 provides a first total output power via the first differential RF output signal and the second differential RF output signal based on the mode select signal MSS. During the second operating mode, the differential RF power amplifier circuitry 18 provides a second total output power via the first differential RF output signal and the second differential RF output signal based on the mode select signal MSS. During the reduced output power operating mode, the differential RF power amplifier circuitry 18 provides a reduced total output power via the first differential RF output signal and the second differential RF output signal based on the mode select signal MSS. The reduced total output power is less than the first total output power and the reduced total output power is less than the second total output power.

Figure 6:
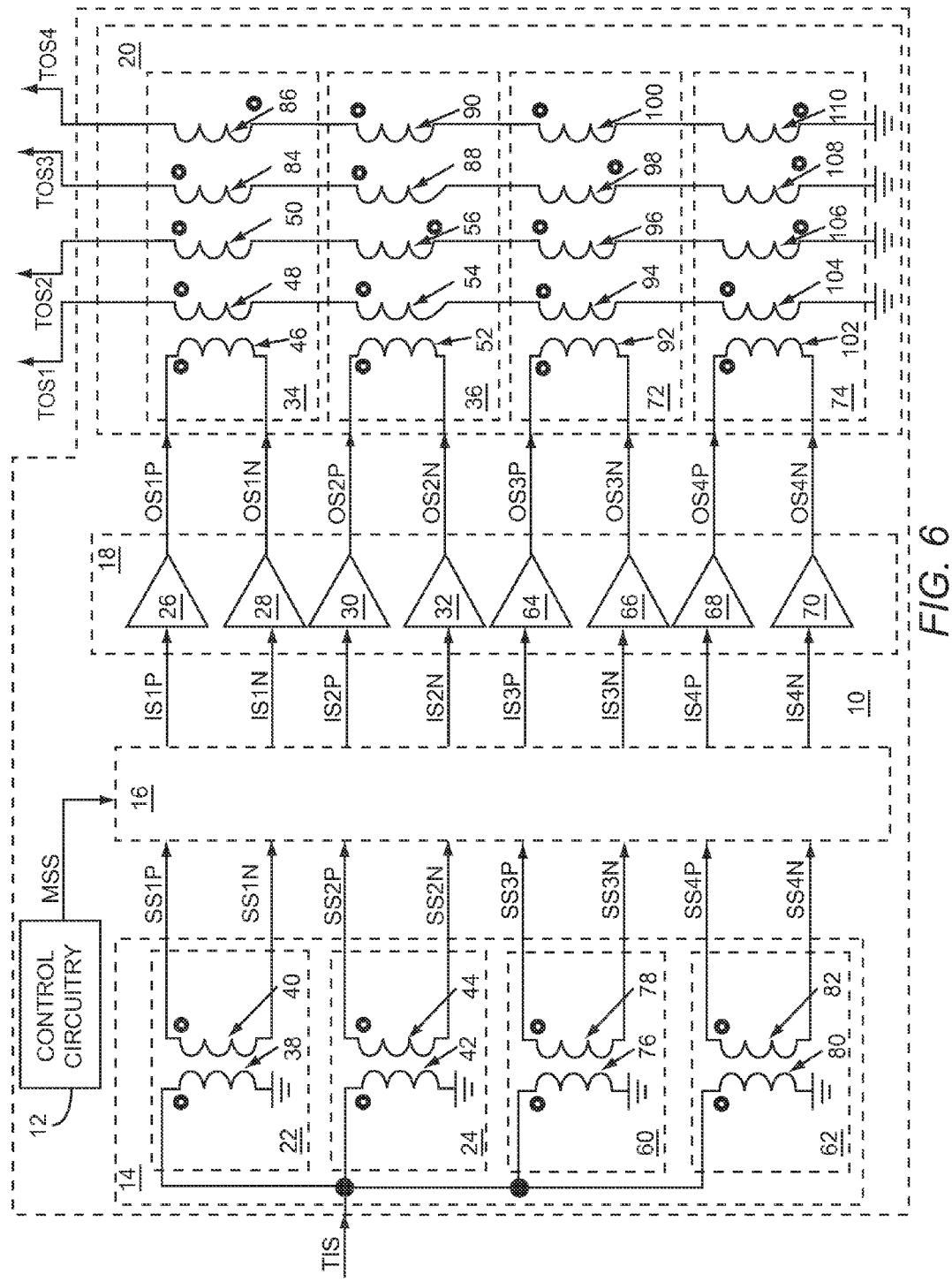
FIG. 6 shows the RF circuitry according to an additional embodiment of the RF circuitry.

FIG. 6 shows the RF circuitry 10 according to an additional embodiment of the RF circuitry 10. The RF circuitry 10 illustrated in FIG. 6 is similar to the RF circuitry 10 illustrated in FIG. 2, except in the RF circuitry 10 illustrated in FIG. 6, the input transformer circuitry 14 further includes a third input transformer element 60 and a fourth input transformer element 62; the differential RF power amplifier circuitry 18 further includes a third positive-side RF power amplifier 64, a third negative-side RF power amplifier 66, a fourth positive-side RF power amplifier 68, and a fourth negative-side RF power amplifier 70; and the output transformer circuitry 20 further includes a third output transformer element 72 and a fourth output transformer element 74.

During operation, the control circuitry 12 may select one of multiple operating modes, which may include the first operating mode, the second operating mode, a third operating mode, and a fourth operating mode. The control circuitry 12 provides the mode select signal MSS to the input switching circuitry 16. The mode select signal MSS may be indicative of which of the multiple operating modes is selected. In general, the mode select signal MSS is based on which of the multiple operating modes is selected.

The input transformer circuitry 14 receives and splits a transformer input signal TIS to provide the first differential RF switching signal, the second differential RF switching signal, a third differential RF switching signal, and a fourth differential RF switching signal to the input switching circuitry 16. The first differential RF switching signal includes the first positive-side RF switching signal SS1P and the first negative-side RF switching signal SS1N, the second differential RF switching signal includes the second positive-side RF switching signal SS2P and the second negative-side RF switching signal SS2N, the third differential RF switching signal includes a third positive-side RF switching signal SS3P and a third negative-side RF switching signal SS3N, and the fourth differential RF switching signal includes a fourth positive-side RF switching signal SS4P and a fourth negative-side RF switching signal SS4N. The first positive-side RF switching signal SS1P may be phase-shifted about 180 degrees from the first negative-side RF switching signal SS1N, the second positive-side RF switching signal SS2P may be phase-shifted about 180 degrees from the second negative-side RF switching signal SS2N, the third positive-side RF switching signal SS3P may be phase-shifted about 180 degrees from the third negative-side RF switching signal SS3N, and the fourth positive-side RF switching signal SS4P may be phase-shifted about 180 degrees from the fourth negative-side RF switching signal SS4N.

In one embodiment of the RF circuitry 10, the transformer input signal TIS is a single-ended signal, as illustrated in FIG. 6. In an alternate embodiment of the RF circuitry 10, which is not shown, the transformer input signal TIS is a differential signal. The input transformer circuitry 14 may split the power provided by the transformer input signal TIS to provide the first differential RF switching signal, the second differential RF switching signal, the third differential RF switching signal, and the fourth differential RF switching signal. As such, the power provided by each of the first differential RF switching signal, the second differential RF switching signal, the third differential RF switching signal, and the fourth differential RF switching signal may be about equal to one another. The input transformer circuitry 14 may be used to provide load line transformation.

The input switching circuitry 16 receives and forwards the first differential RF switching signal to provide the first differential RF input signal based on the mode select signal MSS. The input switching circuitry 16 receives and forwards the second differential RF switching signal to provide a second differential RF input signal based on the mode select signal MSS. The input switching circuitry 16 receives and forwards the third differential RF switching signal to provide a third differential RF input signal based on the mode select signal MSS. The input switching circuitry 16 receives and forwards the fourth differential RF switching signal to provide a fourth differential RF input signal based on the mode select signal MSS.

The first differential RF input signal includes the first positive-side RF input signal IS1P and the first negative-side RF input signal IS1N. The second differential RF input signal includes the second positive-side RF input signal IS2P and the second negative-side RF input signal IS2N. The third differential RF input signal includes a third positive-side RF input signal IS3P and a third negative-side RF input signal IS3N. The fourth differential RF input signal includes a fourth positive-side RF input signal IS4P and a fourth negative-side RF input signal IS4N. The first positive-side RF input signal IS1P may be phase-shifted from the first negative-side RF input signal IS1N by about 180 degrees. The second positive-side RF input signal IS2P may be phase-shifted from the second negative-side RF input signal IS2N by about 180 degrees. The third positive-side RF input signal IS3P may be phase-shifted from the third negative-side RF input signal IS3N by about 180 degrees. The fourth positive-side RF input signal IS4P may be phase-shifted from the fourth negative-side RF input signal IS4N by about 180 degrees.

Depending on the mode select signal MSS, the input switching circuitry 16 may receive and forward the first positive-side RF switching signal SS1P to provide the first positive-side RF input signal IS1P, and receive and forward the first negative-side RF switching signal SS1N to provide the first negative-side RF input signal IS1N. Alternatively, depending on the mode select signal MSS, the input switching circuitry 16 may receive and forward the first positive-side RF switching signal SS1P to provide the first negative-side RF input signal IS1N, and receive and forward the first negative-side RF switching signal SS1N to provide the first positive-side RF input signal IS1P.

Depending on the mode select signal MSS, the input switching circuitry 16 may receive and forward the second positive-side RF switching signal SS2P to provide the second positive-side RF input signal IS2P, and receive and forward the second negative-side RF switching signal SS2N to provide the second negative-side RF input signal IS2N. Alternatively, depending on the mode select signal MSS, the input switching circuitry 16 may receive and forward the second positive-side RF switching signal SS2P to provide the second negative-side RF input signal IS2N, and receive and forward the second negative-side RF switching signal SS2N to provide the second positive-side RF input signal IS2P.

Depending on the mode select signal MSS, the input switching circuitry 16 may receive and forward the third positive-side RF switching signal SS3P to provide the third positive-side RF input signal IS3P, and receive and forward the third negative-side RF switching signal SS3N to provide the third negative-side RF input signal IS3N. Alternatively, depending on the mode select signal MSS, the input switching circuitry 16 may receive and forward the third positive-side RF switching signal SS3P to provide the third negative-side RF input signal IS3N, and receive and forward the third negative-side RF switching signal SS3N to provide the third positive-side RF input signal IS3P.

Depending on the mode select signal MSS, the input switching circuitry 16 may receive and forward the fourth positive-side RF switching signal SS4P to provide the fourth positive-side RF input signal IS4P, and receive and forward the fourth negative-side RF switching signal SS4N to provide the fourth negative-side RF input signal IS4N. Alternatively, depending on the mode select signal MSS, the input switching circuitry 16 may receive and forward the fourth positive-side RF switching signal SS4P to provide the fourth negative-side RF input signal IS4N, and receive and forward the fourth negative-side RF switching signal SS4N to provide the fourth positive-side RF input signal IS4P. In general, the first differential RF input signal, the second differential RF input signal, the third differential RF input signal, and the fourth differential RF input signal are based on splitting the transformer input signal TIS.

In general, the differential RF power amplifier circuitry 18 receives and amplifies the first differential RF input signal to provide a first differential RF output signal, receives and amplifies the second differential RF input signal to provide a second differential RF output signal, receives and amplifies the third differential RF input signal to provide a third differential RF output signal, and receives and amplifies the fourth differential RF input signal to provide a fourth differential RF output signal. The first differential RF output signal includes the first positive-side RF output signal OS1P and the first negative-side RF output signal OS1N, the second differential RF output signal includes the second positive-side RF output signal OS2P and the second negative-side RF output signal OS2N, the third differential RF output signal includes a third positive-side RF output signal OS3P and a third negative-side RF output signal OS3N, and the fourth differential RF output signal includes a fourth positive-side RF output signal OS4P and a fourth negative-side RF output signal OS4N. The first positive-side RF output signal OS1P may be phase-shifted from the first negative-side RF output signal OS1N by about 180 degrees, the second positive-side RF output signal OS2P may be phase-shifted from the second negative-side RF output signal OS2N by about 180 degrees, the third positive-side RF output signal OS3P may be phase-shifted from the third negative-side RF output signal OS3N by about 180 degrees, and the fourth positive-side RF output signal OS4P may be phase-shifted from the fourth negative-side RF output signal OS4N by about 180 degrees.

In the embodiment of the differential RF power amplifier circuitry 18 illustrated in FIG. 6, the first positive-side RF power amplifier 26 receives and amplifies the first positive-side RF input signal IS1P to provide the first positive-side RF output signal OS1P. The first negative-side RF power amplifier 28 receives and amplifies the first negative-side RF input signal IS1N to provide the first negative-side RF output signal OS1N. The second positive-side RF power amplifier 30 receives and amplifies the second positive-side RF input signal IS2P to provide the second positive-side RF output signal OS2P. The second negative-side RF power amplifier 32 receives and amplifies the second negative-side RF input signal IS2N to provide the second negative-side RF output signal OS2N. The third positive-side RF power amplifier 64 receives and amplifies the third positive-side RF input signal IS3P to provide the third positive-side RF output signal OS3P. The third negative-side RF power amplifier 66 receives and amplifies the third negative-side RF input signal IS3N to provide the third negative-side RF output signal OS3N. The fourth positive-side RF power amplifier 68 receives and amplifies the fourth positive-side RF input signal IS4P to provide the fourth positive-side RF output signal OS4P The fourth negative-side RF power amplifier 70 receives and amplifies the fourth negative-side RF input signal IS4N to provide the fourth negative-side RF output signal OS4N.

The output transformer circuitry 20 receives and combines the first differential RF output signal, the second differential RF output signal, the third differential RF output signal, and the fourth differential RF output signal to provide the first transformer output signal TOS1, the second transformer output signal TOS2, a third transformer output signal TOS3, and a fourth transformer output signal TOS4. In one embodiment of the RF circuitry 10, during the first operating mode, the first transformer output signal TOS1 is based on a combination of the first differential RF output signal, the second differential RF output signal, the third differential RF output signal, and the fourth differential RF output signal that substantially reinforce one another. Additionally, during the first operating mode, the second transformer output signal TOS2 is based on a combination of the first differential RF output signal, the second differential RF output signal, the third differential RF output signal, and the fourth differential RF output signal that substantially cancel one another. Further, during the first operating mode, the third transformer output signal TOS3 is based on a combination of the first differential RF output signal, the second differential RF output signal, the third differential RF output signal, and the fourth differential RF output signal that substantially cancel one another. In addition, during the first operating mode, the fourth transformer output signal TOS4 is based on a combination of the first differential RF output signal, the second differential RF output signal, the third differential RF output signal, and the fourth differential RF output signal that substantially cancel one another.

As such, during the first operating mode, the power provided by the first differential RF output signal, the power provided by the second differential RF output signal, the power provided by the third differential RF output signal, and the power provided by the fourth differential RF output signal may substantially combine to provide the power provided by the first transformer output signal TOS1. Since the second transformer output signal TOS2 is based on the combination of the first differential RF output signal, the second differential RF output signal, the third differential RF output signal, and the fourth differential RF output signal that substantially cancel one another, the power provided by the second transformer output signal TOS2 is about zero. Since the third transformer output signal TOS3 is based on the combination of the first differential RF output signal, the second differential RF output signal, the third differential RF output signal, and the fourth differential RF output signal that substantially cancel one another, the power provided by the third transformer output signal TOS3 is about zero. Since the fourth transformer output signal TOS4 is based on the combination of the first differential RF output signal, the second differential RF output signal, the third differential RF output signal, and the fourth differential RF output signal that substantially cancel one another, the power provided by the fourth transformer output signal TOS4 is about zero.

In one embodiment of the RF circuitry 10, during the second operating mode, the second transformer output signal TOS2 is based on a combination of the first differential RF output signal, the second differential RF output signal, the third differential RF output signal, and the fourth differential RF output signal that substantially reinforce one another. Additionally, during the second operating mode, the first transformer output signal TOS1 is based on a combination of the first differential RF output signal, the second differential RF output signal, the third differential RF output signal, and the fourth differential RF output signal that substantially cancel one another. Further, during the second operating mode, the third transformer output signal TOS3 is based on a combination of the first differential RF output signal, the second differential RF output signal, the third differential RF output signal, and the fourth differential RF output signal that substantially cancel one another. In addition, during the second operating mode, the fourth transformer output signal TOS4 is based on a combination of the first differential RF output signal, the second differential RF output signal, the third differential RF output signal, and the fourth differential RF output signal that substantially cancel one another.

As such, during the second operating mode, the power provided by the first differential RF output signal, the power provided by the second differential RF output signal, the power provided by the third differential RF output signal, and the power provided by the fourth differential RF output signal may substantially combine to provide the power provided by the second transformer output signal TOS2. Since the first transformer output signal TOS1 is based on the combination of the first differential RF output signal, the second differential RF output signal, the third differential RF output signal, and the fourth differential RF output signal that substantially cancel one another, the power provided by the first transformer output signal TOS1 is about zero. Since the third transformer output signal TOS3 is based on the combination of the first differential RF output signal, the second differential RF output signal, the third differential RF output signal, and the fourth differential RF output signal that substantially cancel one another, the power provided by the third transformer output signal TOS3 is about zero. Since the fourth transformer output signal TOS4 is based on the combination of the first differential RF output signal, the second differential RF output signal, the third differential RF output signal, and the fourth differential RF output signal that substantially cancel one another, the power provided by the fourth transformer output signal TOS4 is about zero.

In one embodiment of the RF circuitry 10, during the third operating mode, the third transformer output signal TOS3 is based on a combination of the first differential RF output signal, the second differential RF output signal, the third differential RF output signal, and the fourth differential RF output signal that substantially reinforce one another. Additionally, during the third operating mode, the second transformer output signal TOS2 is based on a combination of the first differential RF output signal, the second differential RF output signal, the third differential RF output signal, and the fourth differential RF output signal that substantially cancel one another. Further, during the third operating mode, the first transformer output signal TOS1 is based on a combination of the first differential RF output signal, the second differential RF output signal, the third differential RF output signal, and the fourth differential RF output signal that substantially cancel one another. In addition, during the third operating mode, the fourth transformer output signal TOS4 is based on a combination of the first differential RF output signal, the second differential RF output signal, the third differential RF output signal, and the fourth differential RF output signal that substantially cancel one another.

As such, during the third operating mode, the power provided by the first differential RF output signal, the power provided by the second differential RF output signal, the power provided by the third differential RF output signal, and the power provided by the fourth differential RF output signal may substantially combine to provide the power provided by the third transformer output signal TOS3. Since the second transformer output signal TOS2 is based on the combination of the first differential RF output signal, the second differential RF output signal, the third differential RF output signal, and the fourth differential RF output signal that substantially cancel one another, the power provided by the second transformer output signal TOS2 is about zero. Since the first transformer output signal TOS1 is based on the combination of the first differential RF output signal, the second differential RF output signal, the third differential RF output signal, and the fourth differential RF output signal that substantially cancel one another, the power provided by the first transformer output signal TOS1 is about zero. Since the fourth transformer output signal TOS4 is based on the combination of the first differential RF output signal, the second differential RF output signal, the third differential RF output signal, and the fourth differential RF output signal that substantially cancel one another, the power provided by the fourth transformer output signal TOS4 is about zero.

In one embodiment of the RF circuitry 10, during the fourth operating mode, the fourth transformer output signal TOS4 is based on a combination of the first differential RF output signal, the second differential RF output signal, the third differential RF output signal, and the fourth differential RF output signal that substantially reinforce one another. Additionally, during the fourth operating mode, the second transformer output signal TOS2 is based on a combination of the first differential RF output signal, the second differential RF output signal, the third differential RF output signal, and the fourth differential RF output signal that substantially cancel one another. Further, during the fourth operating mode, the third transformer output signal TOS3 is based on a combination of the first differential RF output signal, the second differential RF output signal, the third differential RF output signal, and the fourth differential RF output signal that substantially cancel one another. In addition, during the fourth operating mode, the first transformer output signal TOS1 is based on a combination of the first differential RF output signal, the second differential RF output signal, the third differential RF output signal, and the fourth differential RF output signal that substantially cancel one another.

As such, during the fourth operating mode, the power provided by the first differential RF output signal, the power provided by the second differential RF output signal, the power provided by the third differential RF output signal, and the power provided by the fourth differential RF output signal may substantially combine to provide the power provided by the fourth transformer output signal TOS4. Since the second transformer output signal TOS2 is based on the combination of the first differential RF output signal, the second differential RF output signal, the third differential RF output signal, and the fourth differential RF output signal that substantially cancel one another, the power provided by the second transformer output signal TOS2 is about zero. Since the third transformer output signal TOS3 is based on the combination of the first differential RF output signal, the second differential RF output signal, the third differential RF output signal, and the fourth differential RF output signal that substantially cancel one another, the power provided by the third transformer output signal TOS3 is about zero. Since the first transformer output signal TOS1 is based on the combination of the first differential RF output signal, the second differential RF output signal, the third differential RF output signal, and the fourth differential RF output signal that substantially cancel one another, the power provided by the first transformer output signal TOS1 is about zero.

In one embodiment of the RF circuitry 10 as shown in FIG. 6, the first transformer output signal TOS1 may be a single-ended signal, the second transformer output signal TOS2 may be a single-ended signal, the third differential RF output signal may be a single-ended signal, and the fourth differential RF output signal may be a single-ended signal. In an alternate embodiment of the RF circuitry 10, which is not shown, the first transformer output signal TOS1 may be a differential signal, the second transformer output signal TOS2 may be a differential signal, the third differential RF output signal may be a differential signal, and the fourth differential RF output signal may be a differential signal. In general, the transformer input signal TIS is de-multiplexed to provide the first transformer output signal TOS1, the second transformer output signal TOS2, the third transformer output signal TOS3, and the fourth transformer output signal TOS4 by using the input switching circuitry 16 to either swap or not swap the differential RF switching signals to provide the differential RF input signals. By de-multiplexing the transformer input signal TIS to provide the first transformer output signal TOS1, the second transformer output signal TOS2, the third differential RF output signal, and the fourth differential RF output signal, a single-pole four-throw (1P4T) switch may be eliminated, which would otherwise be needed, thereby reducing insertion loss, cost, space, or any combination thereof. The output transformer circuitry 20 may be used to provide load line transformation between the differential RF power amplifier circuitry 18 and downstream circuitry (not shown). Further, the output transformer circuitry 20 may be used to provide output transistor biasing of the differential RF power amplifier circuitry 18.

In other embodiments of the RF circuitry 10, the input transformer circuitry 14, the input switching circuitry 16, or both may be replaced with alternate circuitry. Any or all of the control circuitry 12, the input transformer circuitry 14, the input switching circuitry 16, the differential RF power amplifier circuitry 18, and the output transformer circuitry 20 may be provided by one or more semiconductor die. Further, any or all of the control circuitry 12, the input transformer circuitry 14, the input switching circuitry 16, the differential RF power amplifier circuitry 18, and the output transformer circuitry 20 may be provided by one or more interconnecting substrate between semiconductor dies. The interconnecting substrate may be a laminate.

The first input transformer element 22 includes the first input primary leg 38 and the first input secondary leg 40. The second input transformer element 24 includes the second input primary leg 42 and the second input secondary leg 44. The third input transformer element 60 includes a third input primary leg 76 and a third input secondary leg 78. The fourth input transformer element 62 includes a fourth input primary leg 80 and a fourth input secondary leg 82. The first output transformer element 34 includes the first output primary leg 46, the first output alpha secondary leg 48, the first output beta secondary leg 50, a first output gamma secondary leg 84, and a first output delta secondary leg 86. The second output transformer element 36 includes the second output primary leg 52, the second output alpha secondary leg 54, the second output beta secondary leg 56, a second output gamma secondary leg 88, and a second output delta secondary leg 90. The third output transformer element 72 includes a third output primary leg 92, a third output alpha secondary leg 94, a third output beta secondary leg 96, a third output gamma secondary leg 98, and a third output delta secondary leg 100. The fourth output transformer element 74 includes a fourth output primary leg 102, a fourth output alpha secondary leg 104, a fourth output beta secondary leg 106, a fourth output gamma secondary leg 108, and a fourth output delta secondary leg 110.

One end of the first input primary leg 38 is coupled to ground and an opposite end of the first input primary leg 38 receives the transformer input signal TIS. One end of the second input primary leg 42 is coupled to ground and an opposite end of the second input primary leg 42 receives the transformer input signal TIS. One end of the third input primary leg 76 is coupled to ground and an opposite end of the third input primary leg 76 receives the transformer input signal TIS. One end of the fourth input primary leg 80 is coupled to ground and an opposite end of the fourth input primary leg 80 receives the transformer input signal TIS. As such, the transformer input signal TIS is a single-ended signal and the power provided by the transformer input signal TIS is split between the first input transformer element 22, the second input transformer element 24, the third input transformer element 60, and the fourth input transformer element 62.

The first input secondary leg 40 provides the first positive-side RF switching signal SS1P and the first negative-side RF switching signal SS1N. The first input transformer element 22 uses magnetic coupling, electrostatic coupling, or both between the first input primary leg 38 and first input secondary leg 40, such that the first input secondary leg 40 provides the first differential RF switching signal based on transforming the transformer input signal TIS. The phasing of the first input primary leg 38 and first input secondary leg 40 is such that the first positive-side RF switching signal SS1P is about phase-aligned with the transformer input signal TIS.

The second input secondary leg 44 provides the second positive-side RF switching signal SS2P and the second negative-side RF switching signal SS2N. The second input transformer element 24 uses magnetic coupling, electrostatic coupling, or both between the second input primary leg 42 and the second input secondary leg 44, such that the second input secondary leg 44 provides the second differential RF switching signal based on transforming the transformer input signal TIS. The phasing of the second input primary leg 42 and the second input secondary leg 44 is such that the second positive-side RF switching signal SS2P is about phase-aligned with the transformer input signal TIS.

The third input secondary leg 78 provides the third positive-side RF switching signal SS3P and the third negative-side RF switching signal SS3N. The third input transformer element 60 uses magnetic coupling, electrostatic coupling, or both between the third input primary leg 76 and the third input secondary leg 78, such that the third input secondary leg 78 provides the third differential RF switching signal based on transforming the transformer input signal TIS. The phasing of the third input primary leg 76 and the third input secondary leg 78 is such that the third positive-side RF switching signal SS3P is about phase-aligned with the transformer input signal TIS.

The fourth input secondary leg 82 provides the fourth positive-side RF switching signal SS4P and the fourth negative-side RF switching signal SS4N. The fourth input transformer element 62 uses magnetic coupling, electrostatic coupling, or both between the fourth input primary leg 80 and the fourth input secondary leg 82, such that the fourth input secondary leg 82 provides the fourth differential RF switching signal based on transforming the transformer input signal TIS. The phasing of the fourth input primary leg 80 and the fourth input secondary leg 82 is such that the fourth positive-side RF switching signal SS4P is about phase-aligned with the transformer input signal TIS.

The first output primary leg 46 receives the first differential RF output signal, the second output primary leg 52 receives the second differential RF output signal, the third output primary leg 92 receives the third differential RF output signal, and the fourth output primary leg 102 receives the fourth differential RF output signal. Specifically, one end of the first output primary leg 46 receives the first positive-side RF output signal OS1P and an opposite end of the first output primary leg 46 receives the first negative-side RF output signal OS1N. Additionally, one end of the second output primary leg 52 receives the second positive-side RF output signal OS2P and an opposite end of the second output primary leg 52 receives the second negative-side RF output signal OS2N. Further, one end of the third output primary leg 92 receives the third positive-side RF output signal OS3P and an opposite end of the third output primary leg 92 receives the third negative-side RF output signal OS3N. In addition, one end of the fourth output primary leg 102 receives the fourth positive-side RF output signal OS4P and an opposite end of the fourth output primary leg 102 receives the fourth negative-side RF output signal OS4N.

One end of the first output alpha secondary leg 48 provides the first transformer output signal TOS1 and an opposite end of the first output alpha secondary leg 48 is coupled to one end of the second output alpha secondary leg 54. An opposite end of the second output alpha secondary leg 54 is coupled to one end of the third output alpha secondary leg 94. An opposite end of the third output alpha secondary leg 94 is coupled to one end of the fourth output alpha secondary leg 104. An opposite end of the fourth output alpha secondary leg 104 is coupled to ground. Similarly, one end of the first output beta secondary leg 50 provides the second transformer output signal TOS2 and an opposite end of the first output beta secondary leg 50 is coupled to one end of the second output beta secondary leg 56. An opposite end of the second output beta secondary leg 56 is coupled to one end of the third output beta secondary leg 96. An opposite end of the third output beta secondary leg 96 is coupled to one end of the fourth output beta secondary leg 106. An opposite end of the fourth output beta secondary leg 106 is coupled to ground.

Further, one end of the first output gamma secondary leg 84 provides the third transformer output signal TOS3 and an opposite end of the first output gamma secondary leg 84 is coupled to one end of the second output gamma secondary leg 88. An opposite end of the second output gamma secondary leg 88 is coupled to one end of the third output gamma secondary leg 98 and an opposite end of the third output gamma secondary leg 98 is coupled to one end of the fourth output gamma secondary leg 108. An opposite end of the fourth output gamma secondary leg 108 is coupled to ground. Additionally, one end of the first output delta secondary leg 86 provides the fourth transformer output signal TOS4 and an opposite end of the first output delta secondary leg 86 is coupled to one end of the second output delta secondary leg 90. An opposite end of the second output delta secondary leg 90 is coupled to one end of the third output delta secondary leg 100 and an opposite end of the third output delta secondary leg 100 is coupled to one end of the fourth output delta secondary leg 110. An opposite end of the fourth output delta secondary leg 110 is coupled to ground.

As a result, the first output alpha secondary leg 48, the second output alpha secondary leg 54, the third output alpha secondary leg 94, and the fourth output alpha secondary leg 104 are coupled in series to provide the first transformer output signal TOS1. The first output beta secondary leg 50, the second output beta secondary leg 56, the third output beta secondary leg 96, and the fourth output beta secondary leg 106 are coupled in series to provide the second transformer output signal TOS2. The first output gamma secondary leg 84, the second output gamma secondary leg 88, the third output gamma secondary leg 98, and the fourth output gamma secondary leg 108 are coupled in series to provide the third transformer output signal TOS3. The first output delta secondary leg 86, the second output delta secondary leg 90, the third output delta secondary leg 100, and the fourth output delta secondary leg 110 are coupled in series to provide the fourth transformer output signal TOS4. Therefore, in this embodiment, the first transformer output signal TOS1, the second transformer output signal TOS2, the third transformer output signal TOS3, and the fourth transformer output signal TOS4 are single-ended signals.

In this regard, the first output transformer element 34 uses magnetic coupling, electrostatic coupling, or both between the first output primary leg 46 and the first output secondary legs 48, 50, 84, 86, such that the first output alpha secondary leg 48 provides a portion of the first transformer output signal TOS1 based on transforming the first differential RF output signal, the first output beta secondary leg 50 provides a portion of the second transformer output signal TOS2 based on transforming the first differential RF output signal, the first output gamma secondary leg 84 provides a portion of the third transformer output signal TOS3 based on transforming the first differential RF output signal, and the first output delta secondary leg 86 provides a portion of the fourth transformer output signal TOS4 based on transforming the first differential RF output signal.

Additionally, the second output transformer element 36 uses magnetic coupling, electrostatic coupling, or both between the second output primary leg 52 and the second output secondary legs 54, 56, 88, 90, such that the second output alpha secondary leg 54 provides a portion of the first transformer output signal TOS1 based on transforming the second differential RF output signal, the second output beta secondary leg 56 provides a portion of the second transformer output signal TOS2 based on transforming a portion of the second differential RF output signal, the second output gamma secondary leg 88 provides a portion of the third transformer output signal TOS3 based on transforming a portion of the second differential RF output signal, and the second output delta secondary leg 90 provides a portion of the fourth transformer output signal TOS4 based on transforming a portion of the second differential RF output signal.

Further, the third output transformer element 72 uses magnetic coupling, electrostatic coupling, or both between the third output primary leg 92 and the third output secondary legs 94, 96, 98, 100, such that the third output alpha secondary leg 94 provides a portion of the first transformer output signal TOS1 based on transforming the third differential RF output signal, the third output beta secondary leg 96 provides a portion of the second transformer output signal TOS2 based on transforming a portion of the third differential RF output signal, the third output gamma secondary leg 98 provides a portion of the third transformer output signal TOS3 based on transforming a portion of the third differential RF output signal, and the third output delta secondary leg 100 provides a portion of the fourth transformer output signal TOS4 based on transforming a portion of the third differential RF output signal.

In addition, the fourth output transformer element 74 uses magnetic coupling, electrostatic coupling, or both between the fourth output primary leg 102 and the fourth output secondary legs 104, 106, 108, 110, such that the fourth output alpha secondary leg 104 provides a portion of the first transformer output signal TOS1 based on transforming the fourth differential RF output signal, the fourth output beta secondary leg 106 provides a portion of the second transformer output signal TOS2 based on transforming a portion of the fourth differential RF output signal, the fourth output gamma secondary leg 108 provides a portion of the third transformer output signal TOS3 based on transforming a portion of the fourth differential RF output signal, and the fourth output delta secondary leg 110 provides a portion of the fourth transformer output signal TOS4 based on transforming a portion of the fourth differential RF output signal.

Since the output alpha secondary legs 48, 54, 94, 104 are coupled in series, the first transformer output signal TOS1 is about equal to the portions of the first transformer output signal TOS1 provided by each of the alpha secondary legs 48, 54, 94, 104 added to one another. The phasing of the first output primary leg 46 and the first output alpha secondary leg 48 is such that the portion of the first transformer output signal TOS1 provided by the first output alpha secondary leg 48 is about phase-aligned with the first positive-side RF output signal OS1P. The phasing of the second output primary leg 52 and the second output alpha secondary leg 54 is such that the portion of the first transformer output signal TOS1 provided by the second output alpha secondary leg 54 is about phase-aligned with the second positive-side RF output signal OS2P. The phasing of the third output primary leg 92 and the third output alpha secondary leg 94 is such that the portion of the first transformer output signal TOS1 provided by the third output alpha secondary leg 94 is about phase-aligned with the third positive-side RF output signal OS3P. The phasing of the fourth output primary leg 102 and the fourth output alpha secondary leg 104 is such that the portion of the first transformer output signal TOS1 provided by the fourth output alpha secondary leg 104 is about phase-aligned with the fourth positive-side RF output signal OS4P.

Since the output beta secondary legs 50, 56, 96, 106 are coupled in series, the second transformer output signal TOS2 is about equal to the portions of the second transformer output signal TOS2 provided by each of the beta secondary legs 50, 56, 96, 106 added to one another. The phasing of the first output primary leg 46 and the first output beta secondary leg 50 is such that the portion of the second transformer output signal TOS2 provided by the first output beta secondary leg 50 is about phase-aligned with the first positive-side RF output signal OS1P. The phasing of the second output primary leg 52 and the second output beta secondary leg 56 is such that the portion of the second transformer output signal TOS2 provided by the second output beta secondary leg 56 is about phase-aligned with the second negative-side RF output signal OS2N. The phasing of the third output primary leg 92 and the third output beta secondary leg 96 is such that the portion of the second transformer output signal TOS2 provided by the third output beta secondary leg 96 is about phase-aligned with the third positive-side RF output signal OS3P. The phasing of the fourth output primary leg 102 and the fourth output beta secondary leg 106 is such that the portion of the second transformer output signal TOS2 provided by the fourth output beta secondary leg 106 is about phase-aligned with the fourth positive-side RF output signal OS4P.

Since the output gamma secondary legs 84, 88, 98, 108 are coupled in series, the third transformer output signal TOS3 is about equal to the portions of the third transformer output signal TOS3 provided by each of the gamma secondary legs 84, 88, 98, 108 added to one another. The phasing of the first output primary leg 46 and the first output gamma secondary leg 84 is such that the portion of the third transformer output signal TOS3 provided by the first output gamma secondary leg 84 is about phase-aligned with the first positive-side RF output signal OS1P. The phasing of the second output primary leg 52 and the second output gamma secondary leg 88 is such that the portion of the third transformer output signal TOS3 provided by the second output gamma secondary leg 88 is about phase-aligned with the second positive-side RF output signal OS2P. The phasing of the third output primary leg 92 and the third output gamma secondary leg 98 is such that the portion of the third transformer output signal TOS3 provided by the third output gamma secondary leg 98 is about phase-aligned with the third negative-side RF output signal OS3N. The phasing of the fourth output primary leg 102 and the fourth output gamma secondary leg 108 is such that the portion of the third transformer output signal TOS3 provided by the fourth output gamma secondary leg 108 is about phase-aligned with the fourth negative-side RF output signal OS4N.

Since the output delta secondary legs 86, 90, 100, 110 are coupled in series, the fourth transformer output signal TOS4 is about equal to the portions of the fourth transformer output signal TOS4 provided by each of the delta secondary legs 86, 90, 100, 110 added to one another. The phasing of the first output primary leg 46 and the first output delta secondary leg 86 is such that the portion of the fourth transformer output signal TOS4 provided by the first output delta secondary leg 86 is about phase-aligned with the first negative-side RF output signal OS1N. The phasing of the second output primary leg 52 and the second output delta secondary leg 90 is such that the portion of the fourth transformer output signal TOS4 provided by the second output delta secondary leg 90 is about phase-aligned with the second positive-side RF output signal OS2P. The phasing of the third output primary leg 92 and the third output delta secondary leg 100 is such that the portion of the fourth transformer output signal TOS4 provided by the third output delta secondary leg 100 is about phase-aligned with the third positive-side RF output signal OS3P. The phasing of the fourth output primary leg 102 and the fourth output delta secondary leg 110 is such that the portion of the fourth transformer output signal TOS4 provided by the fourth output delta secondary leg 110 is about phase-aligned with the fourth negative-side RF output signal OS4N.

Figure 7:
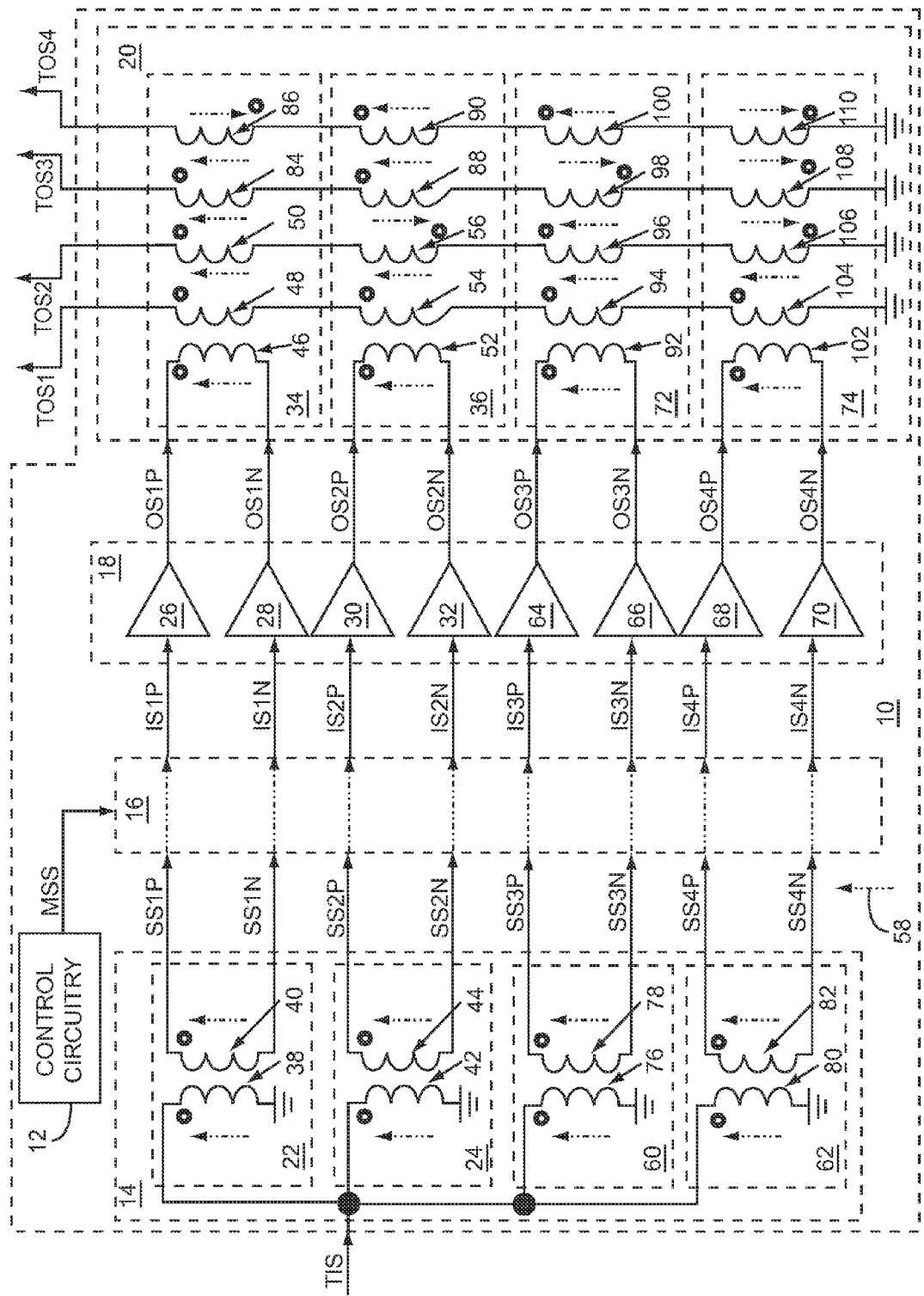
FIG. 7 shows details of the RF circuitry illustrated in FIG. 6 during the first operating mode of the RF circuitry.

FIG. 7 shows details of the RF circuitry 10 illustrated in FIG. 6 during the first operating mode of the RF circuitry 10. FIG. 7 includes the polarity arrows 58 that show the relative phasing of the legs 38, 40, 42, 44, 46, 48, 50, 52, 54, 56, 76, 78, 80, 82, 84, 86, 88, 90, 92, 94, 96, 98, 100, 102, 104, 106, 108, 110. Further, FIG. 7 illustrates forwarding behavior of the input switching circuitry 16.

During the first operating mode, the input switching circuitry 16 is configured, based on the mode select signal MSS, to forward the first positive-side RF switching signal SS1P to provide the first positive-side RF input signal IS1P, to forward the first negative-side RF switching signal SS1N to provide the first negative-side RF input signal IS1N, to forward the second positive-side RF switching signal SS2P to provide the second positive-side RF input signal IS2P, to forward the second negative-side RF switching signal SS2N to provide the second negative-side RF input signal IS2N, to forward the third positive-side RF switching signal SS3P to provide the third positive-side RF input signal IS3P, to forward the third negative-side RF switching signal SS3N to provide the third negative-side RF input signal IS3N, to forward the fourth positive-side RF switching signal SS4P to provide the fourth positive-side RF input signal IS4P, and to forward the fourth negative-side RF switching signal SS4N to provide the fourth negative-side RF input signal IS4N.

As illustrated by the polarity arrows 58, the first positive-side RF switching signal SS1P is about phase-aligned with the transformer input signal TIS, the second positive-side RF switching signal SS2P, the third positive-side RF switching signal SS3P, and the fourth positive-side RF switching signal SS4P are about phase-aligned with the transformer input signal TIS. The first positive-side RF input signal IS1P and the first positive-side RF output signal OS1P are about phase-aligned with the first positive-side RF switching signal SS1P. Therefore, the first positive-side RF output signal OS1P is about phase-aligned with the transformer input signal TIS. The second positive-side RF input signal IS2P and the second positive-side RF output signal OS2P are about phase-aligned with the second positive-side RF switching signal SS2P.

Therefore, the second positive-side RF output signal OS2P is about phase-aligned with the transformer input signal TIS. The third positive-side RF input signal IS3P and the third positive-side RF output signal OS3P are about phase-aligned with the third positive-side RF switching signal SS3P. Therefore, the third positive-side RF output signal OS3P is about phase-aligned with the transformer input signal TIS. The fourth positive-side RF input signal IS4P and the fourth positive-side RF output signal OS4P are about phase-aligned with the fourth positive-side RF switching signal SS4P. Therefore, the fourth positive-side RF output signal OS4P is about phase-aligned with the transformer input signal TIS.

In addition, as illustrated by the polarity arrows 58, the portion of the first transformer output signal TOS1 provided by the first output alpha secondary leg 48 is about phase-aligned with first positive-side RF output signal OS1P, the portion of the first transformer output signal TOS1 provided by the second output alpha secondary leg 54 is about phase-aligned with the second positive-side RF output signal OS2P, the portion of the first transformer output signal TOS1 provided by the third output alpha secondary leg 94 is about phase-aligned with the third positive-side RF output signal OS3P, and the portion of the first transformer output signal TOS1 provided by the fourth output alpha secondary leg 104 is about phase-aligned with the fourth positive-side RF output signal OS4P. Since the first positive-side RF output signal OS1P, the second positive-side RF output signal OS2P, the third positive-side RF output signal OS3P, and the fourth positive-side RF output signal OS4P are about phase-aligned with the transformer input signal TIS, the portion of the first transformer output signal TOS1 provided by each of the output alpha secondary legs 48, 54, 94, 104 are about phase-aligned with one another. As a result, the powers of the portions of the first transformer output signal TOS1 provided by the output alpha secondary legs 48, 54, 94, 104 combine in a reinforcing manner to provide the first transformer output signal TOS1.

Further, as illustrated by the polarity arrows 58, the portion of the second transformer output signal TOS2 provided by the first output beta secondary leg 50 is about phase-aligned with first positive-side RF output signal OS1P, the portion of the second transformer output signal TOS2 provided by the second output beta secondary leg 56 is about phase-aligned with the second negative-side RF output signal OS2N, the portion of the second transformer output signal TOS2 provided by the third output beta secondary leg 96 is about phase-aligned with third positive-side RF output signal OS3P, and the portion of the second transformer output signal TOS2 provided by the fourth output beta secondary leg 106 is about phase-aligned with the fourth negative-side RF output signal OS4N. Since half of the first positive-side RF output signal OS1P, the second negative-side RF output signal OS2N, the third positive-side RF output signal OS3P, and the fourth negative-side RF output signal OS4N are about phase-aligned with the transformer input signal TIS and the other half are phase-shifted about 180 degrees from the transformer input signal TIS, the portion of the second transformer output signal TOS2 provided by each of the output beta secondary legs 50, 56, 96, 106 approximately cancel one another. As a result, the powers of the portions of the second transformer output signal TOS2 provided by the output beta secondary legs 50, 56, 96, 106 combine in a cancelling manner to provide the second transformer output signal TOS2, which would have a resulting power about equal to zero.

Additionally, as illustrated by the polarity arrows 58, the portion of the third transformer output signal TOS3 provided by the first output gamma secondary leg 84 is about phase-aligned with first positive-side RF output signal OS1P, the portion of the third transformer output signal TOS3 provided by the second output gamma secondary leg 88 is about phase-aligned with the second positive-side RF output signal OS2P, the portion of the third transformer output signal TOS3 provided by the third output gamma secondary leg 98 is about phase-aligned with third negative-side RF output signal OS3N, and the portion of the third transformer output signal TOS3 provided by the fourth output gamma secondary leg 108 is about phase-aligned with the fourth negative-side RF output signal OS4N. Since half of the first positive-side RF output signal OS1P, the second positive-side RF output signal OS2P, the third negative-side RF output signal OS3N, and the fourth negative-side RF output signal OS4N are about phase-aligned with the transformer input signal TIS and the other half are phase-shifted about 180 degrees from the transformer input signal TIS, the portion of the third transformer output signal TOS3 provided by each of the output gamma secondary legs 84, 88, 98, 108 approximately cancel one another. As a result, the powers of the portions of the third transformer output signal TOS3 provided by the output gamma secondary legs 84, 88, 98, 108 combine in a cancelling manner to provide the third transformer output signal TOS3, which would have a resulting power about equal to zero.

Furthermore, as illustrated by the polarity arrows 58, the portion of the fourth transformer output signal TOS4 provided by the first output delta secondary leg 86 is about phase-aligned with the first negative-side RF output signal OS1N, the portion of the fourth transformer output signal TOS4 provided by the second output delta secondary leg 90 is about phase-aligned with the second positive-side RF output signal OS2P, the portion of the fourth transformer output signal TOS4 provided by the third output delta secondary leg 100 is about phase-aligned with the third positive-side RF output signal OS3P, and the portion of the fourth transformer output signal TOS4 provided by the fourth output delta secondary leg 110 is about phase-aligned with the fourth negative-side RF output signal OS4N. Since half of the first negative-side RF output signal OS1N, the second positive-side RF output signal OS2P, the third positive-side RF output signal OS3P, and the fourth negative-side RF output signal OS4N are about phase-aligned with the transformer input signal TIS and the other half are phase-shifted about 180 degrees from the transformer input signal TIS, the portion of the fourth transformer output signal TOS4 provided by each of the output delta secondary legs 86, 90, 100, 110 approximately cancel one another. As a result, the powers of the portions of the fourth transformer output signal TOS4 provided by the output delta secondary legs 86, 90 100, 110 combine in a cancelling manner to provide the fourth transformer output signal TOS4, which would have a resulting power about equal to zero.

Figure 8:
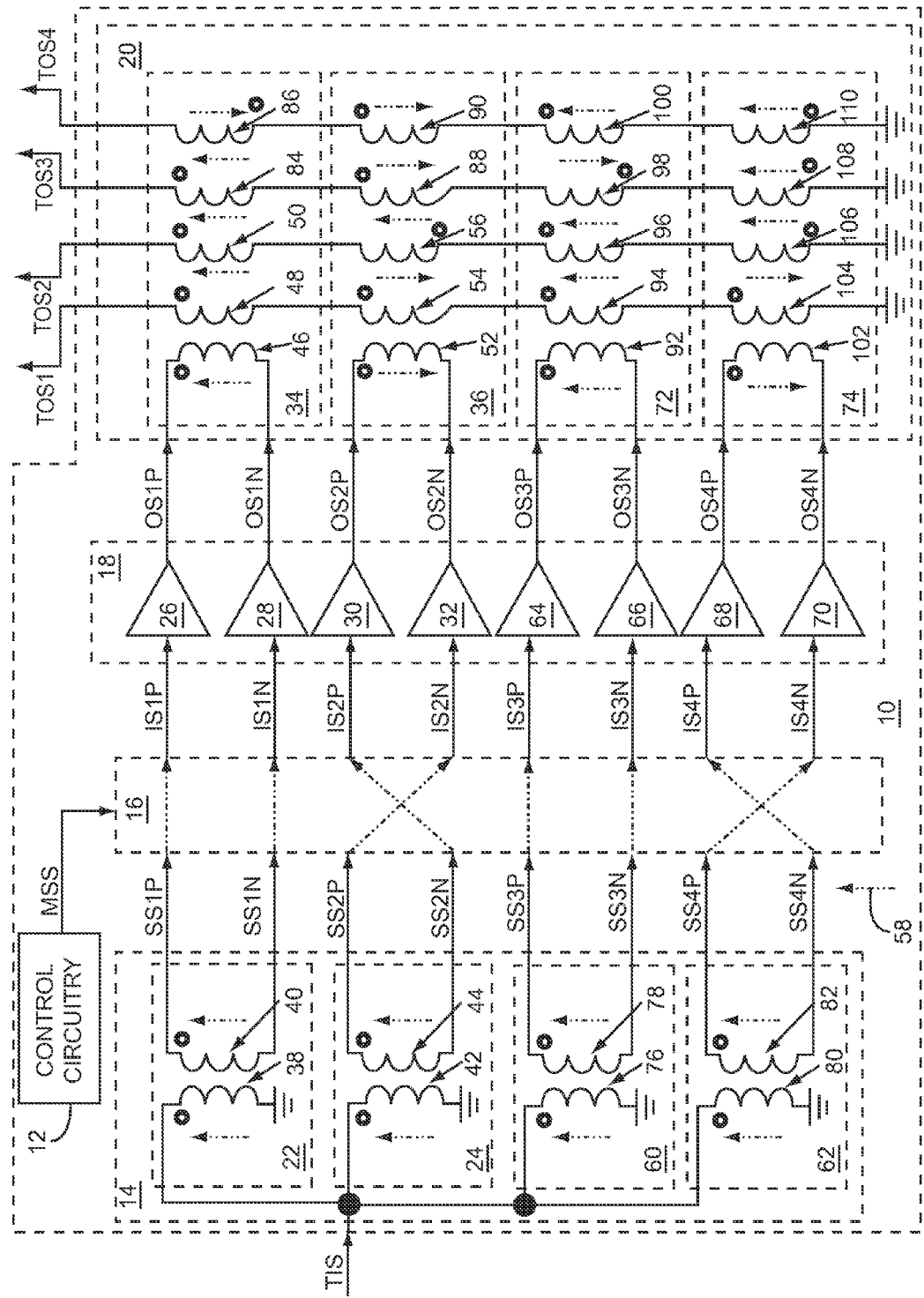
FIG. 8 shows details of the RF circuitry illustrated in FIG. 6 during the second operating mode of the RF circuitry.

FIG. 8 shows details of the RF circuitry 10 illustrated in FIG. 6 during the second operating mode of the RF circuitry 10. FIG. 8 includes the polarity arrows 58 that show the relative phasing of the legs 38, 40, 42, 44, 46, 48, 50, 52, 54, 56, 76, 78, 80, 82, 84, 86, 88, 90, 92, 94, 96, 98, 100, 102, 104, 106, 108, 110. Further, FIG. 8 illustrates forwarding behavior of the input switching circuitry 16.

During the second operating mode, the input switching circuitry 16 is configured, based on the mode select signal MSS, to forward the first positive-side RF switching signal SS1P to provide the first positive-side RF input signal IS1P, to forward the first negative-side RF switching signal SS1N to provide the first negative-side RF input signal IS1N, to forward the second positive-side RF switching signal SS2P to provide the second negative-side RF input signal IS2N, to forward the second negative-side RF switching signal SS2N to provide the second positive-side RF input signal IS2P, to forward the third positive-side RF switching signal SS3P to provide the third positive-side RF input signal IS3P, to forward the third negative-side RF switching signal SS3N to provide the third negative-side RF input signal IS3N, to forward the fourth positive-side RF switching signal SS4P to provide the fourth negative-side RF input signal IS4N, and to forward the fourth negative-side RF switching signal SS4N to provide the fourth positive-side RF input signal IS4P.

As illustrated by the polarity arrows 58, the first positive-side RF switching signal SS1P is about phase-aligned with the transformer input signal TIS, the second positive-side RF switching signal SS2P, the third positive-side RF switching signal SS3P, and the fourth positive-side RF switching signal SS4P are about phase-aligned with the transformer input signal TIS. The first positive-side RF input signal IS1P and the first positive-side RF output signal OS1P are about phase-aligned with the first positive-side RF switching signal SS1P. Therefore, the first positive-side RF output signal OS1P is about phase-aligned with the transformer input signal TIS. The second positive-side RF input signal IS2P and the second positive-side RF output signal OS2P are about phase-aligned with the second negative-side RF switching signal SS2N. Therefore, the second negative-side RF output signal OS2N is about phase-aligned with the transformer input signal TIS. The third positive-side RF input signal IS3P and the third positive-side RF output signal OS3P are about phase-aligned with the third positive-side RF switching signal SS3P. Therefore, the third positive-side RF output signal OS3P is about phase-aligned with the transformer input signal TIS. The fourth positive-side RF input signal IS4P and the fourth positive-side RF output signal OS4P are about phase-aligned with the fourth negative-side RF switching signal SS4N. Therefore, the fourth negative-side RF output signal OS4N is about phase-aligned with the transformer input signal TIS.

In addition, as illustrated by the polarity arrows 58, the portion of the first transformer output signal TOS1 provided by the first output alpha secondary leg 48 is about phase-aligned with first positive-side RF output signal OS1P, the portion of the first transformer output signal TOS1 provided by the second output alpha secondary leg 54 is about phase-aligned with the second negative-side RF output signal OS2N, the portion of the first transformer output signal TOS1 provided by the third output alpha secondary leg 94 is about phase-aligned with third positive-side RF output signal OS3P, and the portion of the first transformer output signal TOS1 provided by the fourth output alpha secondary leg 104 is about phase-aligned with fourth negative-side RF output signal OS4N. Since half of the first positive-side RF output signal OS1P, the second negative-side RF output signal OS2N, the third positive-side RF output signal OS3P, and the fourth negative-side RF output signal OS4N are about phase-aligned with the transformer input signal TIS and the other half are phase-shifted about 180 degrees from the transformer input signal TIS, the portion of the first transformer output signal TOS1 provided by each of the output alpha secondary legs 48, 54, 94, 104 approximately cancel one another. As a result, the powers of the portions of the first transformer output signal TOS1 provided by the output alpha secondary legs 48, 54, 94, 104 combine in a cancelling manner to provide the first transformer output signal TOS1, which would have a resulting power about equal to zero.

Further, as illustrated by the polarity arrows 58, the portion of the second transformer output signal TOS2 provided by the first output beta secondary leg 50 is about phase-aligned with first positive-side RF output signal OS1P, the portion of the second transformer output signal TOS2 provided by the second output beta secondary leg 56 is about phase-aligned with the second positive-side RF output signal OS2P, the portion of the second transformer output signal TOS2 provided by the third output beta secondary leg 96 is about phase-aligned with third positive-side RF output signal OS3P, and the portion of the second transformer output signal TOS2 provided by the fourth output beta secondary leg 106 is about phase-aligned with the fourth positive-side RF output signal OS4P. Since the first positive-side RF output signal OS1P, the second positive-side RF output signal OS2P, the third positive-side RF output signal OS3P, and the fourth positive-side RF output signal OS4P are about phase-aligned with the transformer input signal TIS, the portion of the second transformer output signal TOS2 provided by each of the output beta secondary legs 50, 56, 96, 106 are about phase-aligned with one another. As a result, the powers of the portions of the second transformer output signal TOS2 provided by the output beta secondary legs 50, 56, 96, 106 combine in a reinforcing manner to provide the second transformer output signal TOS2.

Additionally, as illustrated by the polarity arrows 58, the portion of the third transformer output signal TOS3 provided by the first output gamma secondary leg 84 is about phase-aligned with first positive-side RF output signal OS1P, the portion of the third transformer output signal TOS3 provided by the second output gamma secondary leg 88 is about phase-aligned with the second negative-side RF output signal OS2N, the portion of the third transformer output signal TOS3 provided by the third output gamma secondary leg 98 is about phase-aligned with third negative-side RF output signal OS3N, and the portion of the third transformer output signal TOS3 provided by the fourth output gamma secondary leg 108 is about phase-aligned with fourth positive-side RF output signal OS4P. Since half of the first positive-side RF output signal OS1P, the second negative-side RF output signal OS2N, the third negative-side RF output signal OS3N, and the fourth positive-side RF output signal OS4P are about phase-aligned with the transformer input signal TIS and the other half are phase-shifted about 180 degrees from the transformer input signal TIS, the portion of the third transformer output signal TOS3 provided by each of the output gamma secondary legs 84, 88, 98, 108 approximately cancel one another. As a result, the powers of the portions of the third transformer output signal TOS3 provided by the output gamma secondary legs 84, 88, 98, 108 combine in a cancelling manner to provide the third transformer output signal TOS3, which would have a resulting power about equal to zero.

Furthermore, as illustrated by the polarity arrows 58, the portion of the fourth transformer output signal TOS4 provided by the first output delta secondary leg 86 is about phase-aligned with the first negative-side RF output signal OS1N, the portion of the fourth transformer output signal TOS4 provided by the second output delta secondary leg 90 is about phase-aligned with the second negative-side RF output signal OS2N, the portion of the fourth transformer output signal TOS4 provided by the third output delta secondary leg 100 is about phase-aligned with the third positive-side RF output signal OS3P, and the portion of the fourth transformer output signal TOS4 provided by the fourth output delta secondary leg 110 is about phase-aligned with the fourth positive-side RF output signal OS4P. Since half of the first negative-side RF output signal OS1N, the second negative-side RF output signal OS2N, the third positive-side RF output signal OS3P, and the fourth positive-side RF output signal OS4P are about phase-aligned with the transformer input signal TIS and the other half are phase-shifted about 180 degrees from the transformer input signal TIS, the portion of the fourth transformer output signal TOS4 provided by each of the output delta secondary legs 86, 90, 100, 110 approximately cancel one another. As a result, the powers of the portions of the fourth transformer output signal TOS4 provided by the output delta secondary legs 86, 90 100, 110 combine in a cancelling manner to provide the fourth transformer output signal TOS4, which would have a resulting power about equal to zero.

Figure 9:
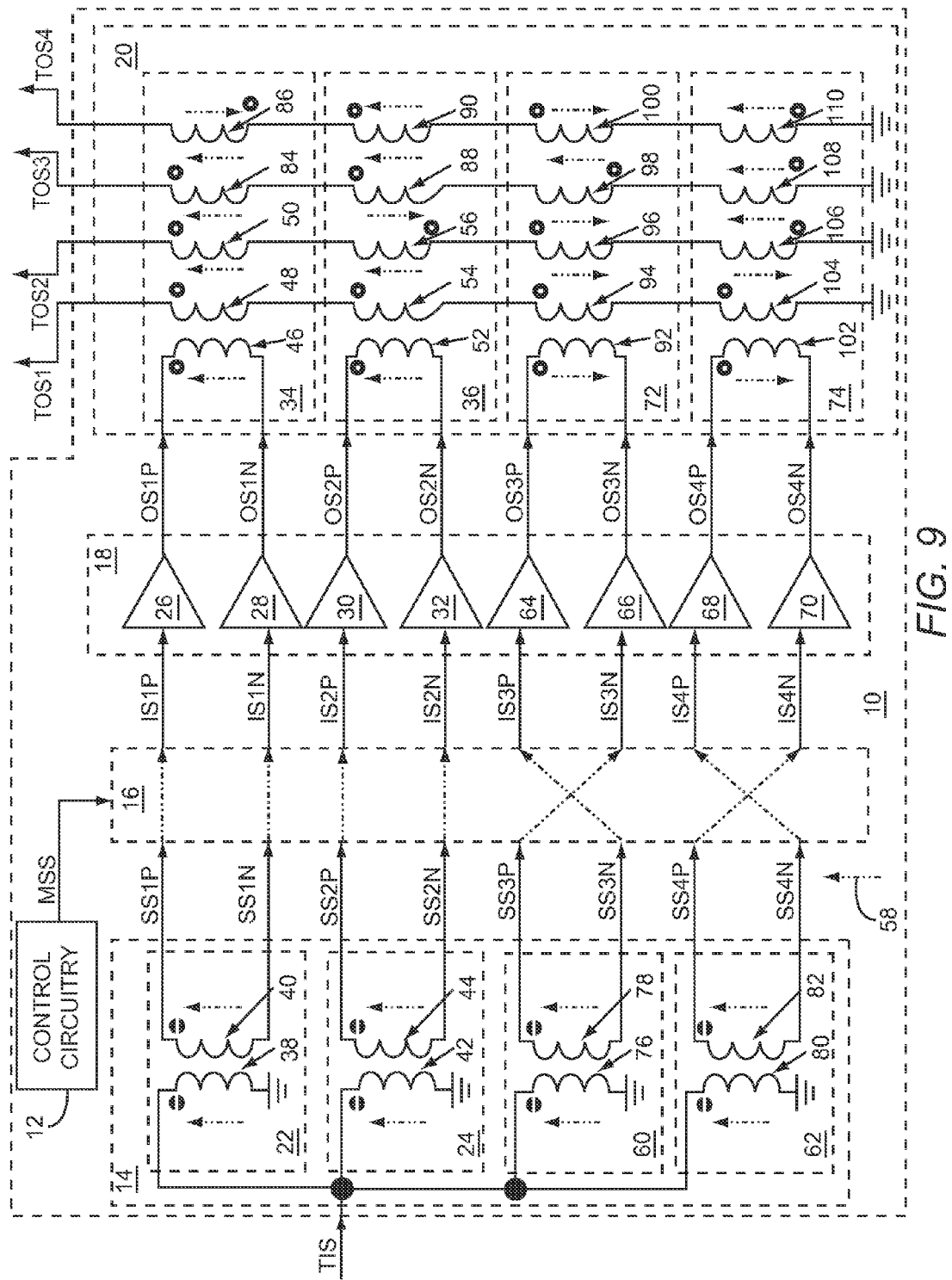
FIG. 9 shows details of the RF circuitry illustrated in FIG. 6 during a third operating mode of the RF circuitry.

FIG. 9 shows details of the RF circuitry 10 illustrated in FIG. 6 during the third operating mode of the RF circuitry 10. FIG. 9 includes the polarity arrows 58 that show the relative phasing of the legs 38, 40, 42, 44, 46, 48, 50, 52, 54, 56, 76, 78, 80, 82, 84, 86, 88, 90, 92, 94, 96, 98, 100, 102, 104, 106, 108, 110. Further, FIG. 9 illustrates forwarding behavior of the input switching circuitry 16.

During the third operating mode, the input switching circuitry 16 is configured, based on the mode select signal MSS, to forward the first positive-side RF switching signal SS1P to provide the first positive-side RF input signal IS1P, to forward the first negative-side RF switching signal SS1N to provide the first negative-side RF input signal IS1N, to forward the second positive-side RF switching signal SS2P to provide the second positive-side RF input signal IS2P, to forward the second negative-side RF switching signal SS2N to provide the second negative-side RF input signal IS2N, to forward the third positive-side RF switching signal SS3P to provide the third negative-side RF input signal IS3N, to forward the third negative-side RF switching signal SS3N to provide the third positive-side RF input signal IS3P, to forward the fourth positive-side RF switching signal SS4P to provide the fourth negative-side RF input signal IS4N, and to forward the fourth negative-side RF switching signal SS4N to provide the fourth positive-side RF input signal IS4P.

As illustrated by the polarity arrows 58, the first positive-side RF switching signal SS1P is about phase-aligned with the transformer input signal TIS, the second positive-side RF switching signal SS2P, the third positive-side RF switching signal SS3P, and the fourth positive-side RF switching signal SS4P are about phase-aligned with the transformer input signal TIS. The first positive-side RF input signal IS1P and the first positive-side RF output signal OS1P are about phase-aligned with the first positive-side RF switching signal SS1P. Therefore, the first positive-side RF output signal OS1P is about phase-aligned with the transformer input signal TIS. The second positive-side RF input signal IS2P and the second positive-side RF output signal OS2P are about phase-aligned with the second positive-side RF switching signal SS2P. Therefore, the second positive-side RF output signal OS2P is about phase-aligned with the transformer input signal TIS. The third positive-side RF input signal IS3P and the third positive-side RF output signal OS3P are about phase-aligned with the third negative-side RF switching signal SS3N. Therefore, the third negative-side RF output signal OS3N is about phase-aligned with the transformer input signal TIS. The fourth positive-side RF input signal IS4P and the fourth positive-side RF output signal OS4P are about phase-aligned with the fourth negative-side RF switching signal SS4N. Therefore, the fourth negative-side RF output signal OS4N is about phase-aligned with the transformer input signal TIS.

In addition, as illustrated by the polarity arrows 58, the portion of the first transformer output signal TOS1 provided by the first output alpha secondary leg 48 is about phase-aligned with first positive-side RF output signal OS1P, the portion of the first transformer output signal TOS1 provided by the second output alpha secondary leg 54 is about phase-aligned with the second positive-side RF output signal OS2P, the portion of the first transformer output signal TOS1 provided by the third output alpha secondary leg 94 is about phase-aligned with third negative-side RF output signal OS3N, and the portion of the first transformer output signal TOS1 provided by the fourth output alpha secondary leg 104 is about phase-aligned with fourth negative-side RF output signal OS4N. Since half of the first positive-side RF output signal OS1P, the second positive-side RF output signal OS2P, the third negative-side RF output signal OS3N, and the fourth negative-side RF output signal OS4N are about phase-aligned with the transformer input signal TIS and the other half are phase-shifted about 180 degrees from the transformer input signal TIS, the portion of the first transformer output signal TOS1 provided by each of the output alpha secondary legs 48, 54, 94, 104 approximately cancel one another. As a result, the powers of the portions of the first transformer output signal TOS1 provided by the output alpha secondary legs 48, 54, 94, 104 combine in a cancelling manner to provide the first transformer output signal TOS1, which would have a resulting power about equal to zero.

Further, as illustrated by the polarity arrows 58, the portion of the second transformer output signal TOS2 provided by the first output beta secondary leg 50 is about phase-aligned with the first positive-side RF output signal OS1P, the portion of the second transformer output signal TOS2 provided by the second output beta secondary leg 56 is about phase-aligned with the second negative-side RF output signal OS2N, the portion of the second transformer output signal TOS2 provided by the third output beta secondary leg 96 is about phase-aligned with the third negative-side RF output signal OS3N, and the portion of the second transformer output signal TOS2 provided by the fourth output beta secondary leg 106 is about phase-aligned with the fourth positive-side RF output signal OS4P. Since half of the first positive-side RF output signal OS1P, the second negative-side RF output signal OS2N, the third negative-side RF output signal OS3N, and the fourth positive-side RF output signal OS4P are about phase-aligned with the transformer input signal TIS and the other half are phase-shifted about 180 degrees from the transformer input signal TIS, the portion of the second transformer output signal TOS2 provided by each of the output beta secondary legs 50, 56, 96, 106 approximately cancel one another. As a result, the powers of the portions of the second transformer output signal TOS2 provided by the output beta secondary legs 50, 56, 96, 106 combine in a cancelling manner to provide the second transformer output signal TOS2, which would have a resulting power about equal to zero.

Additionally, as illustrated by the polarity arrows 58, the portion of the third transformer output signal TOS3 provided by the first output gamma secondary leg 84 is about phase-aligned with the first positive-side RF output signal OS1P, the portion of the third transformer output signal TOS3 provided by the second output gamma secondary leg 88 is about phase-aligned with the second positive-side RF output signal OS2P, the portion of the third transformer output signal TOS3 provided by the third output gamma secondary leg 98 is about phase-aligned with the third positive-side RF output signal OS3P, and the portion of the third transformer output signal TOS3 provided by the fourth output gamma secondary leg 108 is about phase-aligned with the fourth positive-side RF output signal OS4P. Since the first positive-side RF output signal OS1P, the second positive-side RF output signal OS2P, the third positive-side RF output signal OS3P, and the fourth positive-side RF output signal OS4P are about phase-aligned with the transformer input signal TIS, the portion of the third transformer output signal TOS3 provided by each of the output gamma secondary legs 84, 88, 98, 108 are about phase-aligned with one another. As a result, the powers of the portions of the third transformer output signal TOS3 provided by the output gamma secondary legs 84, 88, 98, 108 combine in a reinforcing manner to provide the third transformer output signal TOS3.

Furthermore, as illustrated by the polarity arrows 58, the portion of the fourth transformer output signal TOS4 provided by the first output delta secondary leg 86 is about phase-aligned with first negative-side RF output signal OS1N, the portion of the fourth transformer output signal TOS4 provided by the second output delta secondary leg 90 is about phase-aligned with the second positive-side RF output signal OS2P, the portion of the fourth transformer output signal TOS4 provided by the third output delta secondary leg 100 is about phase-aligned with third negative-side RF output signal OS3N, and the portion of the fourth transformer output signal TOS4 provided by the fourth output delta secondary leg 110 is about phase-aligned with the fourth positive-side RF output signal OS4P. Since half of the first negative-side RF output signal OS1N, the second positive-side RF output signal OS2P, the third negative-side RF output signal OS3N, and the fourth positive-side RF output signal OS4P are about phase-aligned with the transformer input signal TIS and the other half are phase-shifted about 180 degrees from the transformer input signal TIS, the portion of the fourth transformer output signal TOS4 provided by each of the output delta secondary legs 86, 90, 100, 110 approximately cancel one another. As a result, the powers of the portions of the fourth transformer output signal TOS4 provided by the output delta secondary legs 86, 90 100, 110 combine in a cancelling manner to provide the fourth transformer output signal TOS4, which would have a resulting power about equal to zero.

Figure 10:
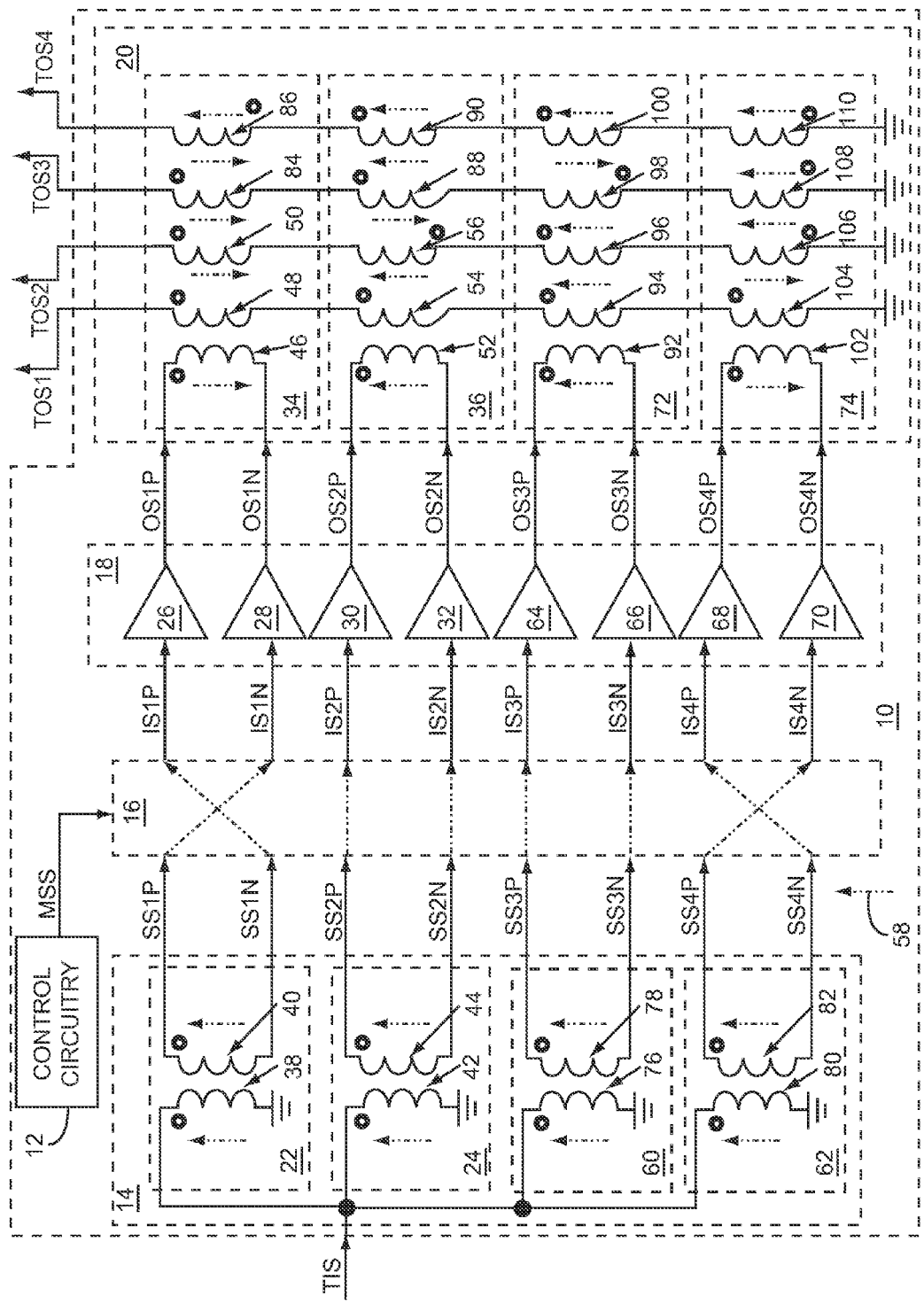
FIG. 10 shows details of the RF circuitry illustrated in FIG. 6 during a fourth operating mode of the RF circuitry.

FIG. 10 shows details of the RF circuitry 10 illustrated in FIG. 6 during the fourth operating mode of the RF circuitry 10. FIG. 10 includes the polarity arrows 58 that show the relative phasing of the legs 38, 40, 42, 44, 46, 48, 50, 52, 54, 56, 76, 78, 80, 82, 84, 86, 88, 90, 92, 94, 96, 98, 100, 102, 104, 106, 108, 110. Further, FIG. 10 illustrates forwarding behavior of the input switching circuitry 16.

During the fourth operating mode, the input switching circuitry 16 is configured, based on the mode select signal MSS, to forward the first positive-side RF switching signal SS1P to provide the first negative-side RF input signal IS1N, to forward the first negative-side RF switching signal SS1N to provide the first positive-side RF input signal IS1P, to forward the second positive-side RF switching signal SS2P to provide the second positive-side RF input signal IS2P, to forward the second negative-side RF switching signal SS2N to provide the second negative-side RF input signal IS2N, to forward the third positive-side RF switching signal SS3P to provide the third positive-side RF input signal IS3P, to forward the third negative-side RF switching signal SS3N to provide the third negative-side RF input signal IS3N, to forward the fourth positive-side RF switching signal SS4P to provide the fourth negative-side RF input signal IS4N, and to forward the fourth negative-side RF switching signal SS4N to provide the fourth positive-side RF input signal IS4P.

As illustrated by the polarity arrows 58, the first positive-side RF switching signal SS1P is about phase-aligned with the transformer input signal TIS, the second positive-side RF switching signal SS2P, the third positive-side RF switching signal SS3P, and the fourth positive-side RF switching signal SS4P are about phase-aligned with the transformer input signal TIS. The first positive-side RF input signal IS1P and the first positive-side RF output signal OS1P are about phase-aligned with the first negative-side RF switching signal SS1N. Therefore, the first negative-side RF output signal OS1N is about phase-aligned with the transformer input signal TIS. The second positive-side RF input signal IS2P and the second positive-side RF output signal OS2P are about phase-aligned with the second positive-side RF switching signal SS2P. Therefore, the second positive-side RF output signal OS2P is about phase-aligned with the transformer input signal TIS. The third positive-side RF input signal IS3P and the third positive-side RF output signal OS3P are about phase-aligned with the third positive-side RF switching signal SS3P. Therefore, the third positive-side RF output signal OS3P is about phase-aligned with the transformer input signal TIS. The fourth positive-side RF input signal IS4P and the fourth positive-side RF output signal OS4P are about phase-aligned with the fourth negative-side RF switching signal SS4N. Therefore, the fourth negative-side RF output signal OS4N is about phase-aligned with the transformer input signal TIS.

In addition, as illustrated by the polarity arrows 58, the portion of the first transformer output signal TOS1 provided by the first output alpha secondary leg 48 is about phase-aligned with the first negative-side RF output signal OS1N, the portion of the first transformer output signal TOS1 provided by the second output alpha secondary leg 54 is about phase-aligned with the second positive-side RF output signal OS2P, the portion of the first transformer output signal TOS1 provided by the third output alpha secondary leg 94 is about phase-aligned with the third positive-side RF output signal OS3P, and the portion of the first transformer output signal TOS1 provided by the fourth output alpha secondary leg 104 is about phase-aligned with fourth negative-side RF output signal OS4N. Since half of the first negative-side RF output signal OS1N, the second positive-side RF output signal OS2P, the third positive-side RF output signal OS3P, and the fourth negative-side RF output signal OS4N are about phase-aligned with the transformer input signal TIS and the other half are phase-shifted about 180 degrees from the transformer input signal TIS, the portion of the first transformer output signal TOS1 provided by each of the output alpha secondary legs 48, 54, 94, 104 approximately cancel one another. As a result, the powers of the portions of the first transformer output signal TOS1 provided by the output alpha secondary legs 48, 54, 94, 104 combine in a cancelling manner to provide the first transformer output signal TOS1, which would have a resulting power about equal to zero.

Further, as illustrated by the polarity arrows 58, the portion of the second transformer output signal TOS2 provided by the first output beta secondary leg 50 is about phase-aligned with the first negative-side RF output signal OS1N, the portion of the second transformer output signal TOS2 provided by the second output beta secondary leg 56 is about phase-aligned with the second negative-side RF output signal OS2N, the portion of the second transformer output signal TOS2 provided by the third output beta secondary leg 96 is about phase-aligned with the third positive-side RF output signal OS3P, and the portion of the second transformer output signal TOS2 provided by the fourth output beta secondary leg 106 is about phase-aligned with the fourth positive-side RF output signal OS4P. Since half of the first negative-side RF output signal OS1N, the second negative-side RF output signal OS2N, the third positive-side RF output signal OS3P, and the fourth positive-side RF output signal OS4P are about phase-aligned with the transformer input signal TIS and the other half are phase-shifted about 180 degrees from the transformer input signal TIS, the portion of the second transformer output signal TOS2 provided by each of the output beta secondary legs 50, 56, 96, 106 approximately cancel one another. As a result, the powers of the portions of the second transformer output signal TOS2 provided by the output beta secondary legs 50, 56, 96, 106 combine in a cancelling manner to provide the second transformer output signal TOS2, which would have a resulting power about equal to zero.

Additionally, as illustrated by the polarity arrows 58, the portion of the third transformer output signal TOS3 provided by the first output gamma secondary leg 84 is about phase-aligned with the first negative-side RF output signal OS1N, the portion of the third transformer output signal TOS3 provided by the second output gamma secondary leg 88 is about phase-aligned with the second negative-side RF output signal OS2N, the portion of the third transformer output signal TOS3 provided by the third output gamma secondary leg 98 is about phase-aligned with the third positive-side RF output signal OS3P, and the portion of the third transformer output signal TOS3 provided by the fourth output gamma secondary leg 108 is about phase-aligned with the fourth positive-side RF output signal OS4P. Since half of the first negative-side RF output signal OS1N, the second negative-side RF output signal OS2N, the third positive-side RF output signal OS3P, and the fourth positive-side RF output signal OS4P are about phase-aligned with the transformer input signal TIS and the other half are phase-shifted about 180 degrees from the transformer input signal TIS, the portion of the third transformer output signal TOS3 provided by each of the output gamma secondary legs 84, 88, 98, 108 approximately cancel one another. As a result, the powers of the portions of the third transformer output signal TOS3 provided by the output gamma secondary legs 84, 88, 98, 108 combine in a cancelling manner to provide the third transformer output signal TOS3, which would have a resulting power about equal to zero.

Furthermore, as illustrated by the polarity arrows 58, the portion of the fourth transformer output signal TOS4 provided by the first output delta secondary leg 86 is about phase-aligned with first positive-side RF output signal OS1P, the portion of the fourth transformer output signal TOS4 provided by the second output delta secondary leg 90 is about phase-aligned with the second positive-side RF output signal OS2P, the portion of the fourth transformer output signal TOS4 provided by the third output delta secondary leg 100 is about phase-aligned with third positive-side RF output signal OS3P, and the portion of the fourth transformer output signal TOS4 provided by the fourth output delta secondary leg 110 is about phase-aligned with fourth positive-side RF output signal OS4P. Since the first positive-side RF output signal OS1P, the second positive-side RF output signal OS2P, the third positive-side RF output signal OS3P, and the fourth positive-side RF output signal OS4P are about phase-aligned with the transformer input signal TIS, the portion of the fourth transformer output signal TOS4 provided by each of the output delta secondary legs 86, 90, 100, 110 are about phase-aligned with one another. As a result, the powers of the portions of the fourth transformer output signal TOS4 provided by the output delta secondary legs 86, 90, 100, 110 combine in a reinforcing manner to provide the fourth transformer output signal TOS4.

Figure 11:
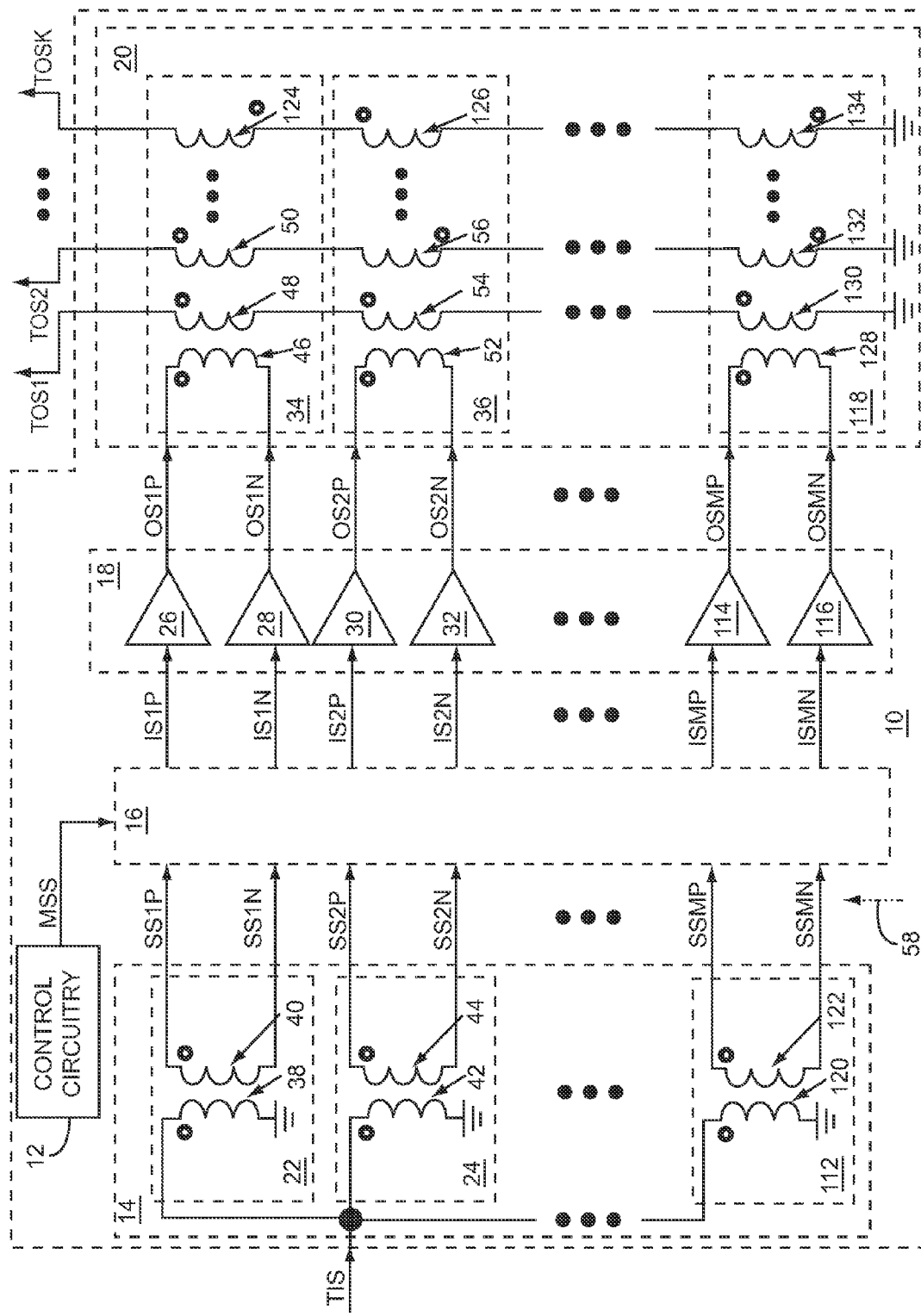
FIG. 11 shows the RF circuitry according to another embodiment of the RF circuitry.

FIG. 11 shows the RF circuitry 10 according to another embodiment of the RF circuitry 10. The RF circuitry 10 illustrated in FIG. 11 is similar to the RF circuitry 10 illustrated in FIG. 2. During operation, the control circuitry 12 may select one of multiple operating modes, which may include the first operating mode, the second operating mode, and up to and including a $K^{TH}$ operating mode. The control circuitry 12 provides a mode select signal MSS to the input switching circuitry 16. The mode select signal MSS may be indicative of which of the multiple operating modes is selected. In general, the mode select signal MSS is based on which of the multiple operating modes is selected.

The input transformer circuitry 14 receives and splits a transformer input signal TIS to provide the first differential RF switching signal, the second differential RF switching signal, and up to and including an $M^{TH}$ differential RF switching signal to the input switching circuitry 16. The first differential RF switching signal includes a first positive-side RF switching signal SS1P and a first negative-side RF switching signal SS1N. The second differential RF switching signal includes a second positive-side RF switching signal SS2P and a second negative-side RF switching signal SS2N. The $M^{TH}$ differential RF switching signal includes an $M^{TH}$ positive-side RF switching signal SSMP and an $M^{TH}$ negative-side RF switching signal SSMN.

The first positive-side RF switching signal SS1P may be phase-shifted about 180 degrees from the first negative-side RF switching signal SS1N, the second positive-side RF switching signal SS2P may be phase-shifted about 180 degrees from the second negative-side RF switching signal SS2N and the $M^{TH}$ positive-side RF switching signal SSMP may be phase-shifted about 180 degrees from the $M^{TH}$ negative-side RF switching signal SSMN. In one embodiment of the RF circuitry 10, the transformer input signal TIS is a single-ended signal. In an alternate embodiment of the RF circuitry 10, the transformer input signal TIS is a differential signal. The input transformer circuitry 14 may split the power provided by the transformer input signal TIS to provide the differential RF switching signals. As such, the power provided by each of the differential RF switching signals may be about equal to one another. The input transformer circuitry 14 may be used to provide load line transformation.

The input switching circuitry 16 receives and forwards the first differential RF switching signal to provide a first differential RF input signal based on the mode select signal MSS, the input switching circuitry 16 receives and forwards the second differential RF switching signal to provide a second differential RF input signal based on the mode select signal MSS, and the input switching circuitry 16 receives and forwards the $M^{TH}$ differential RF switching signal to provide an $M^{TH}$ differential RF input signal based on the mode select signal MSS. The first differential RF input signal includes a first positive-side RF input signal IS1P and a first negative-side RF input signal IS1N, the second differential RF input signal includes a second positive-side RF input signal IS2P and a second negative-side RF input signal IS2N, and the $M^{TH}$ differential RF input signal includes an $M^{TH}$ positive-side RF input signal ISMP and an $M^{TH}$ negative-side RF input signal ISMN. The first positive-side RF input signal IS1P may be phase-shifted from the first negative-side RF input signal IS1N by about 180 degrees, the second positive-side RF input signal IS2P may be phase-shifted from the second negative-side RF input signal IS2N by about 180 degrees, and the $M^{TH}$ positive-side RF input signal ISMP may be phase-shifted from the $M^{TH}$ negative-side RF input signal ISMN by about 180 degrees.

Depending on the mode select signal MSS, the input switching circuitry 16 may receive and forward the first positive-side RF switching signal SS1P to provide the first positive-side RF input signal IS1P, and receive and forward the first negative-side RF switching signal SS1N to provide the first negative-side RF input signal IS1N. Alternatively, depending on the mode select signal MSS, the input switching circuitry 16 may receive and forward the first positive-side RF switching signal SS1P to provide the first negative-side RF input signal IS1N, and receive and forward the first negative-side RF switching signal SS1N to provide the first positive-side RF input signal IS1P.

Similarly, depending on the mode select signal MSS, the input switching circuitry 16 may receive and forward the second positive-side RF switching signal SS2P to provide the second positive-side RF input signal IS2P, and receive and forward the second negative-side RF switching signal SS2N to provide the second negative-side RF input signal IS2N. Alternatively, depending on the mode select signal MSS, the input switching circuitry 16 may receive and forward the second positive-side RF switching signal SS2P to provide the second negative-side RF input signal IS2N, and receive and forward the second negative-side RF switching signal SS2N to provide the second positive-side RF input signal IS2P. In general, the first differential RF input signal and the second differential RF input signal are based on splitting the transformer input signal TIS.

Further, depending on the mode select signal MSS, the input switching circuitry 16 may receive and forward the $M^{TH}$ positive-side RF switching signal SSMP to provide the $M^{TH}$ positive-side RF input signal ISMP, and receive and forward the $M^{TH}$ negative-side RF switching signal SSMN to provide the $M^{TH}$ negative-side RF input signal ISMN. Alternatively, depending on the mode select signal MSS, the input switching circuitry 16 may receive and forward the $M^{TH}$ positive-side RF switching signal SSMP to provide the $M^{TH}$ negative-side RF input signal ISMN, and receive and forward the $M^{TH}$ negative-side RF switching signal SSMN to provide the $M^{TH}$ positive-side RF input signal ISMP. In general, the first differential RF input signal, the second differential RF input signal, and up to and including the $M^{TH}$ differential RF input signal are based on splitting the transformer input signal TIS.

The differential RF power amplifier circuitry 18 receives and amplifies the first differential RF input signal to provide a first differential RF output signal, receives and amplifies the second differential RF input signal to provide a second differential RF output signal, and receives an amplifies up to an including the $M^{TH}$ differential RF input signal to provide an $M^{TH}$ differential RF output signal. The first differential RF output signal includes the first positive-side RF output signal OS1P and the first negative-side RF output signal OS1N, the second differential RF output signal includes the second positive-side RF output signal OS2P and the second negative-side RF output signal OS2N, and the $M^{TH}$ differential RF output signal includes an $M^{TH}$ positive-side RF output signal OSMP and an $M^{TH}$ negative-side RF output signal OSMN. The first positive-side RF output signal OS1P may be phase-shifted from the first negative-side RF output signal OS1N by about 180 degrees, the second positive-side RF output signal OS2P may be phase-shifted from the second negative-side RF output signal OS2N by about 180 degrees, and the $M^{TH}$ positive-side RF output signal OSMP may be phase-shifted from the $M^{TH}$ negative-side RF output signal OSMN by about 180 degrees.

The output transformer circuitry 20 receives and combines the first differential RF output signal, the second differential RF output signal, and up to and including the $M^{TH}$ differential RF output signal to provide the first transformer output signal TOS1, the second transformer output signal TOS2, and up to and including a $K^{TH}$ transformer output signal TOSK. In one embodiment of the RF circuitry 10, during the first operating mode, the first transformer output signal TOS1 is based on a combination of the first differential RF output signal, the second differential RF output signal, and up to and including the $M^{TH}$ differential RF output signal that substantially reinforce one another; the second transformer output signal TOS2 is based on a combination of the first differential RF output signal, the second differential RF output signal, and up to and including the $M^{TH}$ differential RF output signal that substantially cancel one another; and the $K^{TH}$ transformer output signal TOSK is based on a combination of the first differential RF output signal, the second differential RF output signal, and up to and including the $M^{TH}$ differential RF output signal that substantially cancel one another.

Further, in one embodiment of the RF circuitry 10, during the second operating mode, the first transformer output signal TOS1 is based on a combination of the first differential RF output signal, the second differential RF output signal, and up to and including the $M^{TH}$ differential RF output signal that substantially cancel one another; the second transformer output signal TOS2 is based on a combination of the first differential RF output signal, the second differential RF output signal, and up to and including the $M^{TH}$ differential RF output signal that substantially reinforce one another; and the $K^{TH}$ transformer output signal TOSK is based on a combination of the first differential RF output signal, the second differential RF output signal, and up to and including the $M^{TH}$ differential RF output signal that substantially cancel one another.

Additionally, in one embodiment of the RF circuitry 10, during the $K^{TH}$ operating mode, the first transformer output signal TOS1 is based on a combination of the first differential RF output signal, the second differential RF output signal, and up to and including the $M^{TH}$ differential RF output signal that substantially cancel one another; the second transformer output signal TOS2 is based on a combination of the first differential RF output signal, the second differential RF output signal, and up to and including the $M^{TH}$ differential RF output signal that substantially cancel one another; and the $K^{TH}$ transformer output signal TOSK is based on a combination of the first differential RF output signal, the second differential RF output signal, and up to and including the $M^{TH}$ differential RF output signal that substantially reinforce one another. In an exemplary embodiment of the RF circuitry 10, M is an even number.

The input transformer circuitry 14 includes the first input transformer element 22, the second input transformer element 24, and up to and including a $M^{TH}$ input transformer element 112. The differential RF power amplifier circuitry 18 includes the first positive-side RF power amplifier 26, the first negative-side RF power amplifier 28, the second positive-side RF power amplifier 30, the second negative-side RF power amplifier 32, and up to and including an $M^{TH}$ positive-side RF power amplifier 114 and an $M^{TH}$ negative-side RF power amplifier 116. The output transformer circuitry 20 includes the first output transformer element 34, the second output transformer element 36, and up to and including an $M^{TH}$ output transformer element 118. The first input transformer element 22 includes the first input primary leg 38 and the first input secondary leg 40. The second input transformer element 24 includes the second input primary leg 42 and the second input secondary leg 44. The $M^{TH}$ input transformer element 112 includes an $M^{TH}$ input primary leg 120 and an $M^{TH}$ input secondary leg 122.

The first output transformer element 34 includes the first output primary leg 46, the first output alpha secondary leg 48, the first output beta secondary leg 50, and up to and including a first output omega secondary leg 124. The second output transformer element 36 includes the second output primary leg 52, the second output alpha secondary leg 54, the second output beta secondary leg 56, and up to and including a second output omega secondary leg 126. The $M^{TH}$ output transformer element 118 includes an $M^{TH}$ output primary leg 128, an $M^{TH}$ output alpha secondary leg 130, an $M^{TH}$ output beta secondary leg 132, and up to and including an $M^{TH}$ output omega secondary leg 134.

One end of the first input primary leg 38 is coupled to ground and an opposite end of the first input primary leg 38 receives the transformer input signal TIS. One end of the second input primary leg 42 is coupled to ground and an opposite end of the second input primary leg 42 receives the transformer input signal TIS. One end of the $M^{TH}$ input primary leg 120 is coupled to ground and an opposite end of the $M^{TH}$ input primary leg 120 receives the transformer input signal TIS. As such, the transformer input signal TIS is a single-ended signal and the power provided by the transformer input signal TIS is split between the input transformer elements 22, 24, 112. The first input secondary leg 40 provides the first positive-side RF switching signal SS1P and the first negative-side RF switching signal SS1N. The first input transformer element 22 uses magnetic coupling, electrostatic coupling, or both between the first input primary leg 38 and first input secondary leg 40, such that the first input secondary leg 40 provides the first differential RF switching signal based on transforming the transformer input signal TIS. The phasing of the first input primary leg 38 and first input secondary leg 40 is such that the first positive-side RF switching signal SS1P is about phase-aligned with the transformer input signal TIS.

The second input secondary leg 44 provides the second positive-side RF switching signal SS2P and the second negative-side RF switching signal SS2N. The second input transformer element 24 uses magnetic coupling, electrostatic coupling, or both between the second input primary leg 42 and the second input secondary leg 44, such that the second input secondary leg 44 provides the second differential RF switching signal based on transforming the transformer input signal TIS. The phasing of the second input primary leg 42 and the second input secondary leg 44 is such that the second positive-side RF switching signal SS2P is about phase-aligned with the transformer input signal TIS.

The $M^{TH}$ input secondary leg 122 provides the $M^{TH}$ positive-side RF switching signal SSMP and the $M^{TH}$ negative-side RF switching signal SSMN. The $M^{TH}$ input transformer element 112 uses magnetic coupling, electrostatic coupling, or both between the $M^{TH}$ input primary leg 120 and the $M^{TH}$ input secondary leg 122, such that the $M^{TH}$ input secondary leg 122 provides the $M^{TH}$ differential RF switching signal based on transforming the transformer input signal TIS. The phasing of the $M^{TH}$ input primary leg 120 and the $M^{TH}$ input secondary leg 122 is such that the $M^{TH}$ positive-side RF switching signal SSMP is about phase-aligned with the transformer input signal TIS.

The first positive-side RF power amplifier 26 receives and amplifies the first positive-side RF input signal IS1P to provide the first positive-side RF output signal OS1P. The first negative-side RF power amplifier 28 receives and amplifies the first negative-side RF input signal IS1N to provide the first negative-side RF output signal OS1N. The second positive-side RF power amplifier 30 receives and amplifies the second positive-side RF input signal IS2P to provide the second positive-side RF output signal OS2P. The second negative-side RF power amplifier 32 receives and amplifies the second negative-side RF input signal IS2N to provide the second negative-side RF output signal OS2N. The $M^{TH}$ positive-side RF power amplifier 114 receives and amplifies the $M^{TH}$ positive-side RF input signal ISMP to provide the $M^{TH}$ positive-side RF output signal OSMP. The $M^{TH}$ negative-side RF power amplifier 116 receives and amplifies the $M^{TH}$ negative-side RF input signal ISMN to provide the $M^{TH}$ negative-side RF output signal OSMN.

The first output primary leg 46 receives the first differential RF output signal, the second output primary leg 52 receives the second differential RF output signal, and the $M^{TH}$ output primary leg 128 receives the $M^{TH}$ differential RF output signal. Specifically, one end of the first output primary leg 46 receives the first positive-side RF output signal OS1P and an opposite end of the first output primary leg 46 receives the first negative-side RF output signal OS1N. Further, one end of the second output primary leg 52 receives the second positive-side RF output signal OS2P and an opposite end of the second output primary leg 52 receives the second negative-side RF output signal OS2N. Additionally, one end of the $M^{TH}$ output primary leg 128 receives the $M^{TH}$ positive-side RF output signal OSMP and an opposite end of the $M^{TH}$ output primary leg 128 receives the $M^{TH}$ negative-side RF output signal OSMN.

One end of the first output alpha secondary leg 48 provides the first transformer output signal TOS1 and an opposite end of the first output alpha secondary leg 48 is coupled to one end of the second output alpha secondary leg 54. An opposite end of the second output alpha secondary leg 54 is coupled via any intermediary alpha secondary legs (not shown) to one end of the $M^{TH}$ output alpha secondary leg 130. An opposite end of the $M^{TH}$ output alpha secondary leg 130 is coupled to ground. Similarly, one end of the first output beta secondary leg 50 provides the second transformer output signal TOS2 and an opposite end of the first output beta secondary leg 50 is coupled via any intermediary beta secondary legs (not shown) to one end of the $M^{TH}$ output beta secondary leg 132. An opposite end of the $M^{TH}$ output beta secondary leg 132 is coupled to ground. Further, one end of the first output omega secondary leg 124 provides the $K^{TH}$ transformer output signal TOSK and an opposite end of the first output omega secondary leg 124 is coupled to one end of the second output omega secondary leg 126. An opposite end of the second output omega secondary leg 126 is coupled via any intermediary omega secondary legs (not shown) to one end of the $M^{TH}$ output omega secondary leg 134. An opposite end of the $M^{TH}$ output omega secondary leg 134 is coupled to ground.

As such, the first output alpha secondary leg 48, the second output alpha secondary leg 54, and up to and including the $M^{TH}$ output alpha secondary leg 130 are coupled in series to provide the first transformer output signal TOS1. The first output beta secondary leg 50, the second output beta secondary leg 56, and up to and including the $M^{TH}$ output beta secondary leg 132 are coupled in series to provide the second transformer output signal TOS2. The first output omega secondary leg 124, the second output omega secondary leg 126, and up to and including the $M^{TH}$ output omega secondary leg 134 are coupled in series to provide the $K^{TH}$ transformer output signal TOSK. Therefore, in this embodiment, the first transformer output signal TOS1, the second transformer output signal TOS2, and up to and including the $K^{TH}$ transformer output signal TOSK are single-ended signals.

Figure 12:
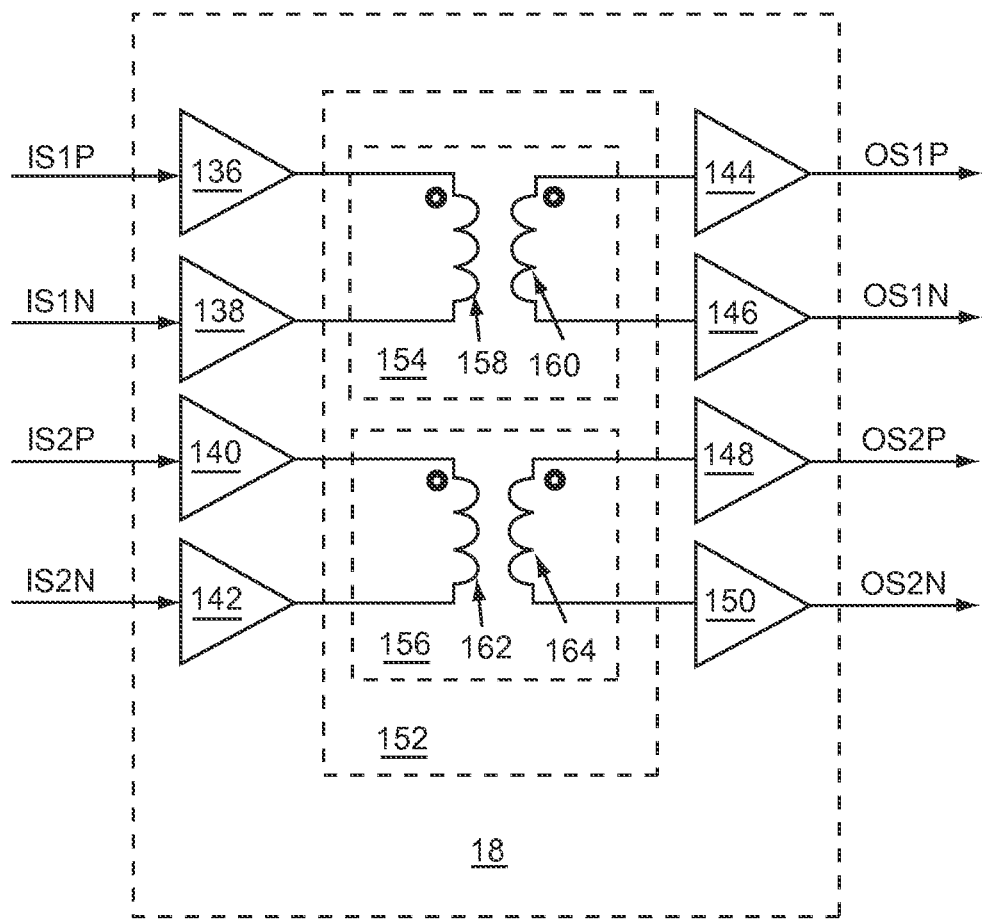
FIG. 12 shows details of the differential RF power amplifier circuitry illustrated in FIG. 1 according to one embodiment of the differential RF power amplifier circuitry.

FIG. 12 shows details of the differential RF power amplifier circuitry 18 illustrated in FIG. 1 according to one embodiment of the differential RF power amplifier circuitry 18. The differential RF power amplifier circuitry 18 includes a first positive-side input stage 136, a first negative-side input stage 138, a second positive-side input stage 140, a second negative-side input stage 142, a first positive-side output stage 144, a first negative-side output stage 146, a second positive-side output stage 148, a second negative-side output stage 150, and intermediate transformer circuitry 152. The intermediate transformer circuitry 152 may be used to provide load line transformation between the input stages 136, 138, 140, 142 and the output stages 144, 146, 148, 150.

The first intermediate transformer element 154 includes a first intermediate primary leg 158 and a first intermediate secondary leg 160. The second intermediate transformer element 156 includes a second intermediate primary leg 162 and a second intermediate secondary leg 164. The first positive-side input stage 136 and the first negative-side input stage 138 receive and amplify the first positive-side RF input signal IS1P and the first negative-side RF input signal IS1N, respectively, to feed the first intermediate primary leg 158. The first intermediate secondary leg 160 feeds the first positive-side output stage 144 and the first negative-side output stage 146 based on transforming the amplified first positive-side RF input signal IS1P and the first negative-side RF input signal IS1N, respectively. The first positive-side output stage 144 and the first negative-side output stage 146 apply output stage amplification to provide the first positive-side RF output signal OS1P and the first negative-side RF output signal OS1N, respectively The second positive-side input stage 140 and the second negative-side input stage 142 receive and amplify the second positive-side RF input signal IS2P and the second negative-side RF input signal IS2N, respectively, to feed the second intermediate primary leg 162. The second intermediate secondary leg 164 feeds the second positive-side output stage 148 and the second negative-side output stage 150 based on transforming the amplified second positive-side RF input signal IS2P and the second negative-side RF input signal IS2N, respectively. The second positive-side output stage 148 and the second negative-side output stage 150 apply output stage amplification to provide the second positive-side RF output signal OS2P and the second negative-side RF output signal OS2N, respectively.

Figure 13:
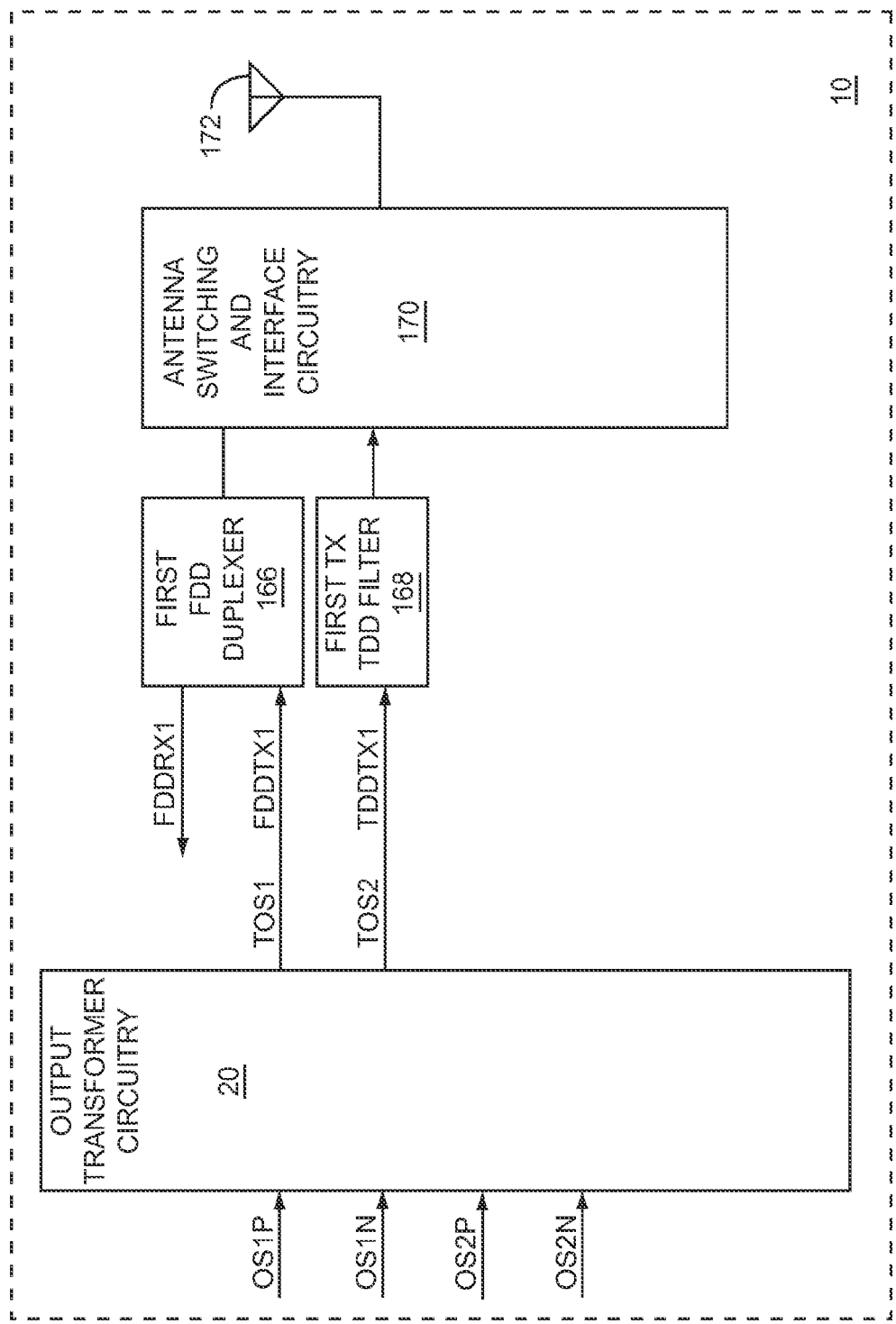
FIG. 13 shows the RF circuitry according to one embodiment of the RF circuitry.

FIG. 13 shows the RF circuitry 10 according to one embodiment of the RF circuitry 10. The RF circuitry 10 illustrated in FIG. 13 does not show the control circuitry 12, the input transformer circuitry 14, the input switching circuitry 16, and the differential RF power amplifier circuitry 18 for simplification of the illustration. The RF circuitry 10 includes the output transformer circuitry 20, a first FDD duplexer 166, a first transmit TDD harmonic filter 168, antenna switching and interface circuitry 170, and a first antenna 172. The first transformer output signal TOS1 provides a first frequency division duplex (FDD) transmit signal FDDTX1 to the first FDD duplexer 166, which may forward the first FDD transmit signal FDDTX1 to the first antenna 172 via the antenna switching and interface circuitry 170 for transmission. Further, the first FDD duplexer 166 may receive and forward a first FDD receive signal FDDRX1 from the first antenna 172 via the antenna switching and interface circuitry 170. The first FDD duplexer 166 may enable simultaneous transmission and reception of the first FDD transmit signal FDDTX1 and the first FDD receive signal FDDRX1. In this regard, the first transformer output signal TOS1 may be a full duplex transmit signal and the first FDD receive signal FDDRX1 may be a full duplex receive signal.

The second transformer output signal TOS2 provides a first time division duplex (TDD) transmit signal TDDTX1 to the first transmit TDD harmonic filter 168, which may forward the first TDD transmit signal TDDTX1 to the first antenna 172 via the antenna switching and interface circuitry 170. The RF circuitry 10 may preclude simultaneous transmission and reception of the first TDD transmit signal TDDTX1 and a complementary receive signal (not shown). As such, the second transformer output signal TOS2 may be a half duplex transmit signal.

Figure 14:
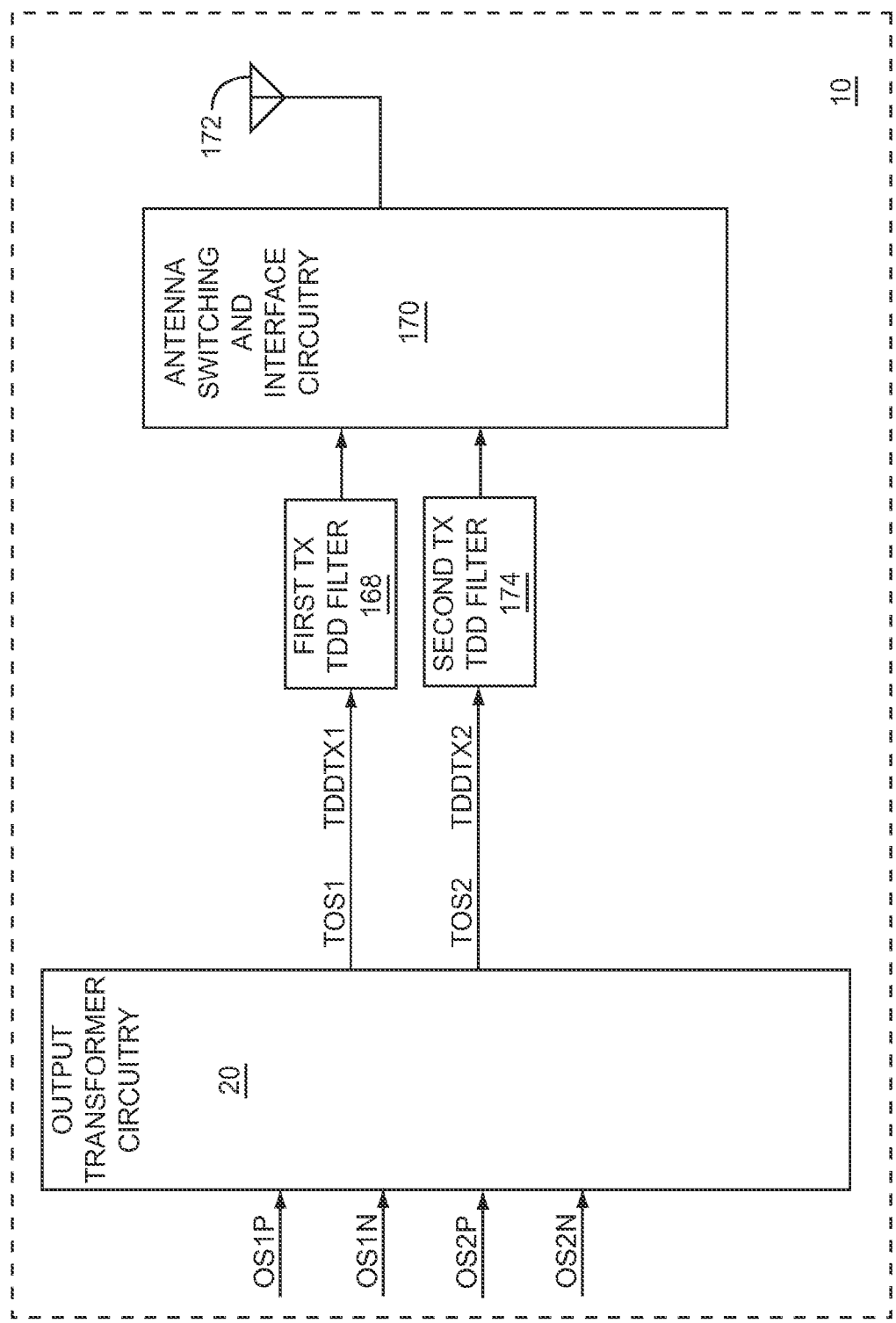
FIG. 14 shows the RF circuitry according to an alternate embodiment of the RF circuitry.

FIG. 14 shows the RF circuitry 10 according to an alternate embodiment of the RF circuitry 10. The RF circuitry 10 illustrated in FIG. 14 does not show the control circuitry 12, the input transformer circuitry 14, the input switching circuitry 16, and the differential RF power amplifier circuitry 18 for simplification of the illustration. The RF circuitry 10 includes the output transformer circuitry 20, the first transmit TDD harmonic filter 168, the antenna switching and interface circuitry 170, the first antenna 172, and a second transmit TDD harmonic filter 174. The first transformer output signal TOS1 provides the first TDD transmit signal TDDTX1 to the first transmit TDD harmonic filter 168, which may forward the first TDD transmit signal TDDTX1 to the first antenna 172 via the antenna switching and interface circuitry 170 for transmission. The second transformer output signal TOS2 provides a second TDD transmit signal TDDTX2 to the second transmit TDD harmonic filter 174, which may forward the second TDD transmit signal TDDTX2 to the first antenna 172 via the antenna switching and interface circuitry 170 for transmission.

The RF circuitry 10 may preclude simultaneous transmission and reception of the first TDD transmit signal TDDTX1 and a complementary receive signal (not shown). As such, the first transformer output signal TOS1 may be a half duplex transmit signal. Similarly, the RF circuitry 10 may preclude simultaneous transmission and reception of the second TDD transmit signal TDDTX2 and a complementary receive signal (not shown). As such, the second transformer output signal TOS2 may be a half duplex transmit signal. The first transformer output signal TOS1 may be in a first communications band, which may be a highband communications band. The second transformer output signal TOS2 may be in a second communications band, which may be a lowband communications band. The second communications band may not overlap the first communications band. A center frequency of the first communications band may be greater than about two times a center frequency of the second communications band.

Figure 15:
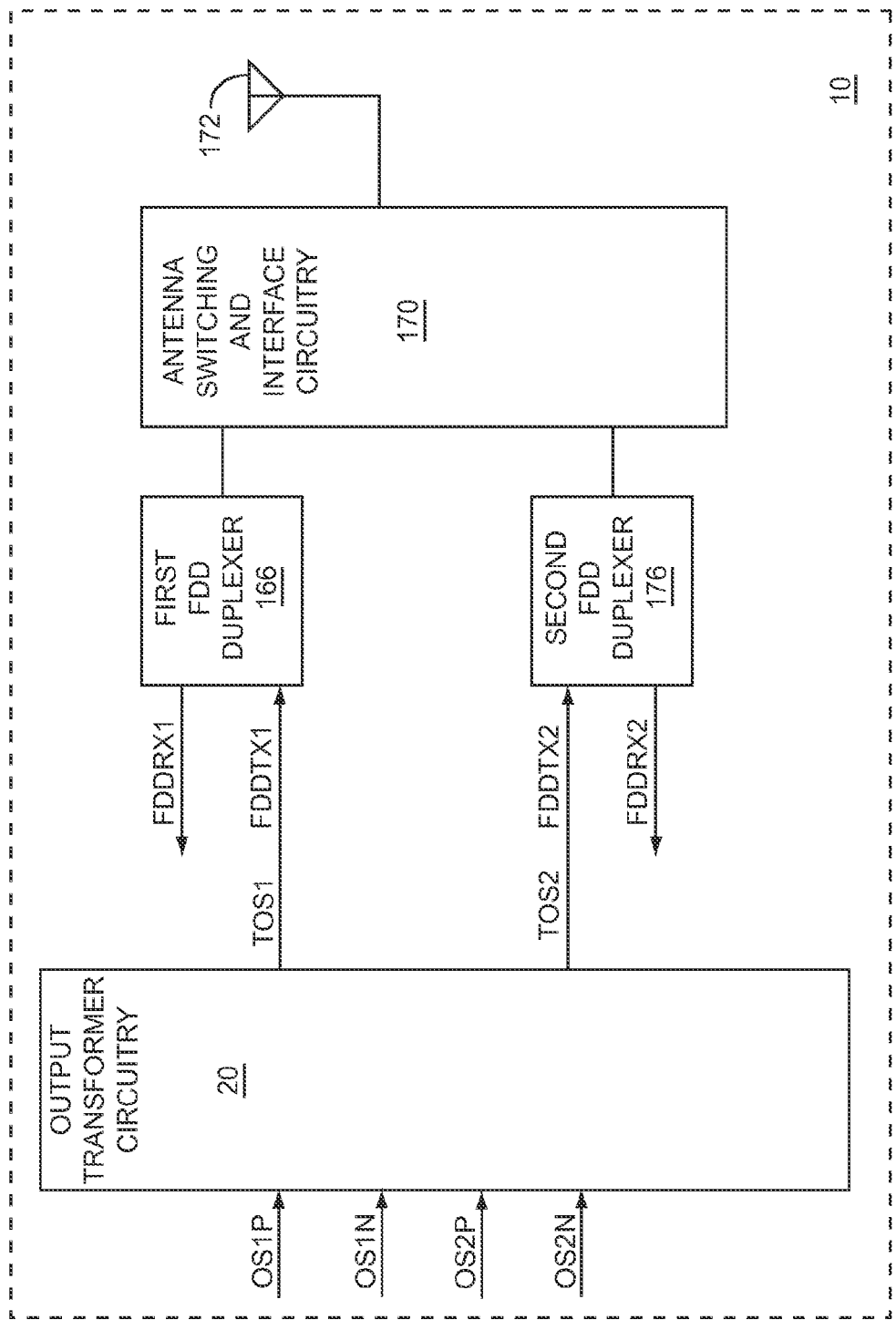
FIG. 15 shows the RF circuitry according to an additional embodiment of the RF circuitry.

FIG. 15 shows the RF circuitry 10 according to an additional embodiment of the RF circuitry 10. The RF circuitry 10 illustrated in FIG. 15 does not show the control circuitry 12, the input transformer circuitry 14, the input switching circuitry 16, and the differential RF power amplifier circuitry 18 for simplification of the illustration. The RF circuitry 10 includes the output transformer circuitry 20, the first FDD duplexer 166, a second FDD duplexer 176, the antenna switching and interface circuitry 170, and the first antenna 172. The first transformer output signal TOS1 provides the first FDD transmit signal FDDTX1 to the first FDD duplexer 166, which may forward the first FDD transmit signal FDDTX1 to the first antenna 172 via the antenna switching and interface circuitry 170 for transmission. Further, the first FDD duplexer 166 may receive and forward a first FDD receive signal FDDRX1 from the first antenna 172 via the antenna switching and interface circuitry 170. The first FDD duplexer 166 may enable simultaneous transmission and reception of the first FDD transmit signal FDDTX1 and the first FDD receive signal FDDRX1. In this regard, the first transformer output signal TOS1 may be a full duplex transmit signal and the first FDD receive signal FDDRX1 may be a full duplex receive signal.

The second transformer output signal TOS2 provides the second FDD transmit signal FDDTX2 to the second FDD duplexer 176, which may forward the second FDD transmit signal FDDTX2 to the first antenna 172 via the antenna switching and interface circuitry 170 for transmission. Further, the second FDD duplexer 176 may receive and forward a second FDD receive signal FDDRX2 from the first antenna 172 via the antenna switching and interface circuitry 170. The second FDD duplexer 176 may enable simultaneous transmission and reception of the second FDD transmit signal FDDTX2 and the second FDD receive signal FDDRX2. In this regard, the second transformer output signal TOS2 may be a full duplex transmit signal and the second FDD receive signal FDDRX2 may be a full duplex receive signal. The first transformer output signal TOS1 may be in a first communications band, which may be a highband communications band. The second transformer output signal TOS2 may be in a second communications band, which may be a lowband communications band. The second communications band may not overlap the first communications band. A center frequency of the first communications band may be greater than about two times a center frequency of the second communications band.

Figure 16:
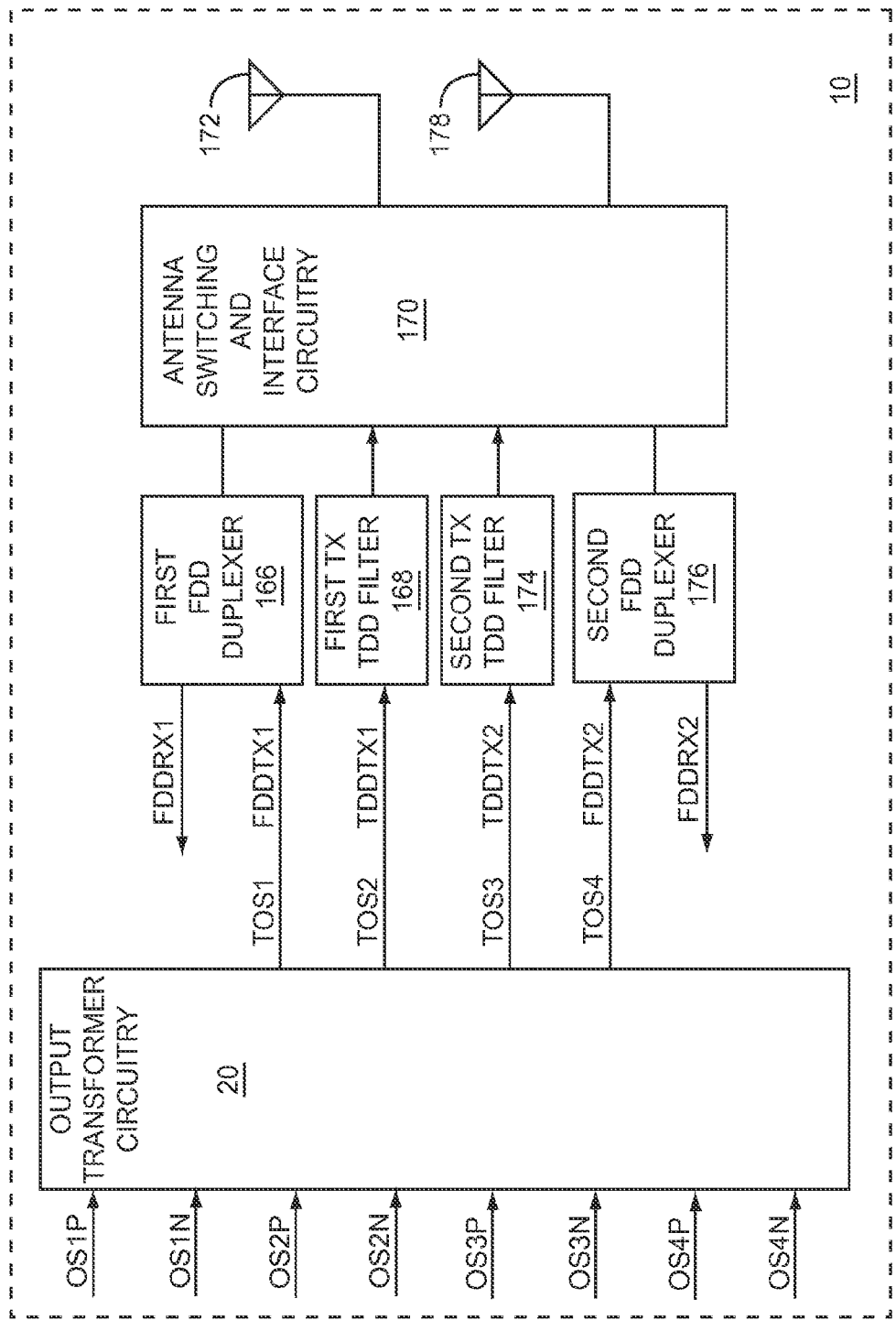
FIG. 16 shows the RF circuitry according to another embodiment of the RF circuitry.

FIG. 16 shows the RF circuitry 10 according to another embodiment of the RF circuitry 10. The RF circuitry 10 illustrated in FIG. 16 does not show the control circuitry 12, the input transformer circuitry 14, the input switching circuitry 16, and the differential RF power amplifier circuitry 18 for simplification of the illustration. The RF circuitry 10 includes the output transformer circuitry 20, the first FDD duplexer 166, first transmit TDD harmonic filter 168, the second transmit TDD harmonic filter 174, the second FDD duplexer 176, the antenna switching and interface circuitry 170, and the first antenna 172.

The first transformer output signal TOS1 provides the first FDD transmit signal FDDTX1 to the first FDD duplexer 166, which may forward the first FDD transmit signal FDDTX1 to the first antenna 172 via the antenna switching and interface circuitry 170 for transmission. Further, the first FDD duplexer 166 may receive and forward a first FDD receive signal FDDRX1 from the first antenna 172 via the antenna switching and interface circuitry 170. The first FDD duplexer 166 may enable simultaneous transmission and reception of the first FDD transmit signal FDDTX1 and the first FDD receive signal FDDRX1. In this regard, the first transformer output signal TOS1 may be a first full duplex transmit signal and the first FDD receive signal FDDRX1 may be a first full duplex receive signal.

The second transformer output signal TOS2 provides the first TDD transmit signal TDDTX1 to the first transmit TDD harmonic filter 168, which may forward the first TDD transmit signal TDDTX1 to the first antenna 172 via the antenna switching and interface circuitry 170 for transmission. The third transformer output signal TOS3 provides a second TDD transmit signal TDDTX2 to the second transmit TDD harmonic filter 174, which may forward the second TDD transmit signal TDDTX2 to the first antenna 172 via the antenna switching and interface circuitry 170 for transmission.

The RF circuitry 10 may preclude simultaneous transmission and reception of the first TDD transmit signal TDDTX1 and a complementary receive signal (not shown). As such, the second transformer output signal TOS2 may be a first half duplex transmit signal. Similarly, the RF circuitry 10 may preclude simultaneous transmission and reception of the second TDD transmit signal TDDTX2 and a complementary receive signal (not shown). As such, the third transformer output signal TOS3 may be a second half duplex transmit signal.

The fourth transformer output signal TOS4 provides the second FDD transmit signal FDDTX2 to the second FDD duplexer 176, which may forward the second FDD transmit signal FDDTX2 to the first antenna 172 via the antenna switching and interface circuitry 170 for transmission. Further, the second FDD duplexer 176 may receive and forward the second FDD receive signal FDDRX2 from the first antenna 172 via the antenna switching and interface circuitry 170. The second FDD duplexer 176 may enable simultaneous transmission and reception of the second FDD transmit signal FDDTX2 and the second FDD receive signal FDDRX2. In this regard, the fourth transformer output signal TOS4 may be a second full duplex transmit signal and the second FDD receive signal FDDRX2 may be a second full duplex receive signal.

The first full duplex transmit signal and the first half duplex transmit signal may be in a first communications band, such that the first full duplex transmit signal and the first half duplex transmit signal may be highband transmit signals. The second full duplex transmit signal and the second half duplex transmit signal may be in a second communications band, such that the second full duplex transmit signal and the second half duplex transmit signal may be lowband transmit signals. The second communications band may not overlap the first communications band. A center frequency of the first communications band may be greater than about two times a center frequency of the second communications band.

Figure 17:
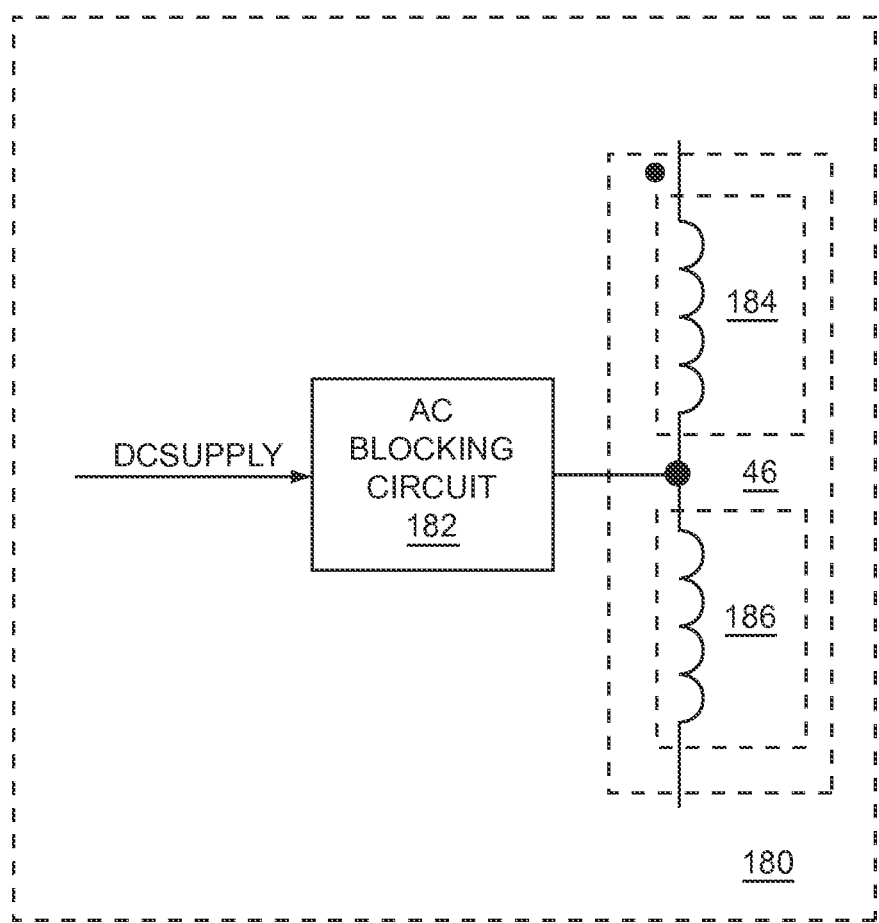
FIG. 17 shows details of a portion of output transformer circuitry illustrated in FIG. 2 according to one embodiment of the portion of the output transformer circuitry.

FIG. 17 shows details of a portion 180 of the output transformer circuitry 20 illustrated in FIG. 2 according to one embodiment of the portion 180 of the output transformer circuitry 20. The portion 180 of the output transformer circuitry 20 includes the first output primary leg 46 and the AC blocking circuit 182. The first output primary leg 46 includes a first output primary sub-leg 184 and a second output primary sub-leg 186 which are coupled in series to provide the first output primary leg 46. The AC blocking circuit 182 is coupled between a DC supply DCSUPPLY and a junction of the first output primary sub-leg 184 and the second output primary sub-leg 186. As such, the first output primary leg 46 may provide part of load line transformation and the combination of the DC supply DCSUPPLY, the AC blocking circuit 182, the first output primary sub-leg 184, and the second output primary sub-leg 186 may provide collector bias to the first positive-side RF power amplifier 26 (FIG. 2) and to the first negative-side RF power amplifier 28 (FIG. 2).

Figure 18:
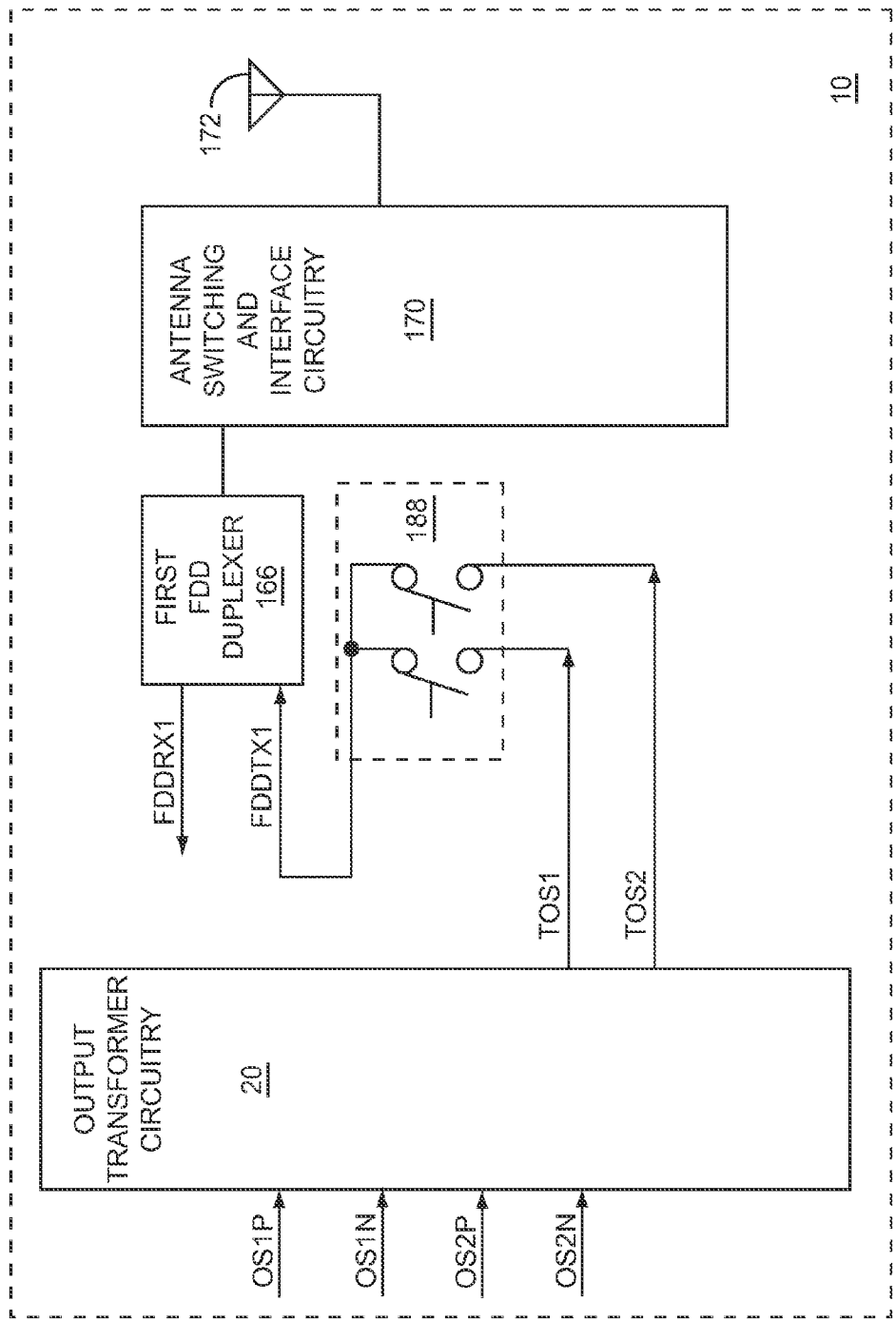
FIG. 18 shows the RF circuitry according to a further embodiment of the RF circuitry.

FIG. 18 shows the RF circuitry 10 according to a further embodiment of the RF circuitry 10. The RF circuitry 10 illustrated in FIG. 18 does not show the control circuitry 12, the input transformer circuitry 14, the input switching circuitry 16, and the differential RF power amplifier circuitry 18 for simplification of the illustration. The RF circuitry 10 includes the output transformer circuitry 20, the first FDD duplexer 166, the interface circuitry 170, the first antenna 172, and a 1P2T switch 188. The 1P2T switch 188 receives and selects either the first transformer output signal TOS1 or the second transformer output signal TOS2 to provide the FDD transmit signal FDDTX1 to the first FDD duplexer 166. The first output alpha secondary leg 48 (FIG. 2) and the second output alpha secondary leg 54 (FIG. 2) may provide a first load-line conversion ratio for the differential RF power amplifier circuitry 18 via the first transformer output signal TOS1. The first output beta secondary leg 50 (FIG. 2) and the second output beta secondary leg 56 (FIG. 2) may provide a second load-line conversion ratio for the differential RF power amplifier circuitry 18 that is not equal to the first load-line conversion ratio. In this regard, the 1P2T switch 188 may select one of two different load-line conversion ratios for the differential RF power amplifier circuitry 18. As a result, the load-line conversion ratio may be selected to minimize power consumption of the differential RF power amplifier circuitry 18, depending on output power from the differential RF power amplifier circuitry 18. Alternate embodiments of the RF circuitry 10 may include any number of transformer output signals TOS1, TOS2 feeding a single-pole any-throw switch to provide any number of load-line conversion ratios to provide further flexibility to minimize power consumption of the differential RF power amplifier circuitry 18.

Some of the circuitry previously described may use discrete circuitry, integrated circuitry, programmable circuitry, non-volatile circuitry, volatile circuitry, software executing instructions on computing hardware, firmware executing instructions on computing hardware, the like, or any combination thereof. The computing hardware may include mainframes, micro-processors, micro-controllers, DSPs, the like, or any combination thereof.

None of the embodiments of the present disclosure are intended to limit the scope of any other embodiment of the present disclosure. Any or all of any embodiment of the present disclosure may be combined with any or all of any other embodiment of the present disclosure to create new embodiments of the present disclosure.

Those skilled in the art will recognize improvements and modifications to the preferred embodiments of the present disclosure. All such improvements and modifications are considered within the scope of the concepts disclosed herein and the claims that follow.

What is claimed is:

1. Radio frequency (RF) circuitry comprising:
control circuitry configured to select one of a plurality of operating modes, which includes a first operating mode and a second operating mode;
differential RF power amplifier circuitry configured to:
receive and amplify a first differential RF input signal to provide a first differential RF output signal; and
receive and amplify a second differential RF input signal to provide a second differential RF output signal; and
output transformer circuitry configured to receive and combine the first differential RF output signal and the second differential RF output signal to provide a first transformer output signal and a second transformer output signal, such that:
during the first operating mode, the first transformer output signal is based on a combination of the first differential RF output signal and the second differential RF output signal that substantially reinforce one another, and the second transformer output signal is based on a combination of the first differential RF output signal and the second differential RF output signal that substantially cancel one another; and
during the second operating mode, the first transformer output signal is based on a combination of the first differential RF output signal and the second differential RF output signal that substantially cancel one another, and the second transformer output signal is based on a combination of the first differential RF output signal and the second differential RF output signal that substantially reinforce one another.

2. The RF circuitry of claim 1 further comprising input transformer circuitry configured to receive and split a transformer input signal, such that the first differential RF input signal and the second differential RF input signal are based on the split the transformer input signal, wherein the transformer input signal is de-multiplexed to provide the first transformer output signal and the second transformer output signal.

3. The RF circuitry of claim 2 wherein the transformer input signal is a single-ended signal.

4. The RF circuitry of claim 2 further comprising input switching circuitry, such that:
the input transformer circuitry is further configured to receive and split the transformer input signal to provide a first differential RF switching signal and a second differential RF switching signal;
the control circuitry is further configured to provide a mode select signal based on the one of the plurality of operating modes; and
the input switching circuitry is configured to:
receive the mode select signal;
receive the first differential RF switching signal to provide the first differential RF input signal based on the mode select signal; and
receive the second differential RF switching signal to provide the second differential RF input signal based on the mode select signal.

5. The RF circuitry of claim 4 wherein:
the first differential RF switching signal has a first positive-side RF switching signal and a first negative-side RF switching signal;
the second differential RF switching signal has a second positive-side RF switching signal and a second negative-side RF switching signal;
the first differential RF input signal has a first positive-side RF input signal and a first negative-side RF input signal;
the second differential RF input signal has a second positive-side RF input signal and a second negative-side RF input signal;
during the first operating mode, the input switching circuitry is further configured to:
forward the first positive-side RF switching signal to provide the first positive-side RF input signal;
forward the first negative-side RF switching signal to provide the first negative-side RF input signal;
forward the second positive-side RF switching signal to provide the second positive-side RF input signal; and
forward the second negative-side RF switching signal to provide the second negative-side RF input signal; and
during the second operating mode, the input switching circuitry is further configured to:
forward the first positive-side RF switching signal to provide the first positive-side RF input signal;
forward the first negative-side RF switching signal to provide the first negative-side RF input signal;
forward the second positive-side RF switching signal to provide the second negative-side RF input signal; and
forward the second negative-side RF switching signal to provide the second positive-side RF input signal.

6. The RF circuitry of claim 4 wherein the input transformer circuitry comprises:
a first input transformer element having:
a first input primary leg configured to receive the transformer input signal; and
a first input secondary leg configured to provide the first differential RF switching signal based on transforming the transformer input signal; and
a second input transformer element having:
a second input primary leg configured to receive the transformer input signal; and
a second input secondary leg configured to provide the second differential RF switching signal based on transforming the transformer input signal.

7. The RF circuitry of claim 1 wherein:
the first differential RF input signal has a first positive-side RF input signal and a first negative-side RF input signal;
the second differential RF input signal has a second positive-side RF input signal and a second negative-side RF input signal;
the first differential RF output signal has a first positive-side RF output signal and a first negative-side RF output signal;

the second differential RF output signal has a second positive-side RF output signal and a second negative-side RF output signal; and the differential RF power amplifier circuitry comprises:
- a first positive-side RF power amplifier configured to receive and amplify the first positive-side RF input signal to provide the first positive-side RF output signal;
- a first negative-side RF power amplifier configured to receive and amplify the first negative-side RF input signal to provide the first negative-side RF output signal;
- a second positive-side RF power amplifier configured to receive and amplify the second positive-side RF input signal to provide the second positive-side RF output signal; and
- a second negative-side RF power amplifier configured to receive and amplify the second negative-side RF input signal to provide the second negative-side RF output signal.

8. The RF circuitry of claim 1 wherein the output transformer circuitry comprises:
a first output transformer element having:
- a first output primary leg configured to receive the first differential RF output signal;
- a first output alpha secondary leg configured to provide a portion of the first transformer output signal based on transforming the first differential RF output signal; and
- a first output beta secondary leg configured to provide a portion of the second transformer output signal based on transforming the first differential RF output signal; and a second output transformer element having:
- a second output primary leg configured to receive the second differential RF output signal;
- a second output alpha secondary leg coupled in series with the first output alpha secondary leg and configured to provide a portion of the first transformer output signal based on transforming the second differential RF output signal; and
- a second output beta secondary leg coupled in series with the first output beta secondary leg and configured to provide a portion of the second transformer output signal based on transforming the second differential RF output signal.

9. The RF circuitry of claim 1 wherein the first transformer output signal is a single-ended signal and the second transformer output signal is a single-ended signal.

10. The RF circuitry of claim 1 wherein:
the plurality of operating modes includes the first operating mode, the second operating mode, and up to and including a $K^{TH}$ operating mode;
the differential RF power amplifier circuitry is further configured to receive and amplify each of a plurality of differential RF input signals to provide a corresponding each of a plurality of differential RF output signals;
the plurality of differential RF input signals includes the first differential RF input signal, the second differential RF input signal, and up to and including an $M^{TH}$ differential RF input signal;
the plurality of differential RF output signals includes the first differential RF output signal, the second differential RF output signal, and up to and including an $M^{TH}$ differential RF output signal;
a plurality of transformer output signals includes the first transformer output signal, the transformer output signal, and up to and including a $K^{TH}$ transformer output signal;
the output transformer circuitry is further configured to receive and combine the plurality of differential RF output signals to provide the plurality of transformer output signals, such that:
- during the first operating mode, the first transformer output signal is based on a combination of the plurality of differential RF output signals that substantially reinforce one another, the second transformer output signal is based on a combination of the plurality of differential RF output signals that substantially cancel one another, and the $K^{TH}$ transformer output signal is based on a combination of the plurality of differential RF output signals that substantially cancel one another;
- during the second operating mode, the first transformer output signal is based on a combination of the plurality of differential RF output signals that substantially cancel one another, the second transformer output signal is based on a combination of the plurality of differential RF output signals that substantially reinforce one another, and the $K^{TH}$ transformer output signal is based on a combination of the plurality of differential RF output signals that substantially cancel one another; and
- during the $K^{TH}$ operating mode, the first transformer output signal is based on a combination of the plurality of differential RF output signals that substantially cancel one another, the second transformer output signal is based on a combination of the plurality of differential RF output signals that substantially cancel one another, and the $K^{TH}$ transformer output signal is based on a combination of the plurality of differential RF output signals that substantially reinforce one another.

11. The RF circuitry of claim 10 wherein M is an even number.

12. The RF circuitry of claim 1 wherein:
the control circuitry is further configured to provide a mode select signal based on the one of the plurality of operating modes;
the plurality of operating mode further includes a reduced output power operating mode;
the differential RF power amplifier circuitry is configured to:
- receive the mode select signal;
- during the first operating mode, provide a first total output power based on the mode select signal;
- during the second operating mode, provide a second total output power based on the mode select signal; and
- during the reduced output power operating mode, provide a reduced total output power based on the mode select signal;

the reduced total output power is less than the first total output power; and
the reduced total output power is less than the second total output power.

13. The RF circuitry of claim 1 wherein:
the first transformer output signal is a full duplex transmit signal; and
the second transformer output signal is a half duplex transmit signal.

14. The RF circuitry of claim 1 wherein:
the first transformer output signal is a half duplex transmit signal in a first communications band; and
the second transformer output signal is a half duplex transmit signal in a second communications band, which does not overlay the first communications band.

15. The RF circuitry of claim 1 wherein:
the first transformer output signal is a full duplex transmit signal in a first communications band; and
the second transformer output signal is a full duplex transmit signal in a second communications band, which does not overlay the first communications band.

16. The RF circuitry of claim 1 wherein the first transformer output signal is associated with a first load-line conversion ratio for the differential RF power amplifier circuitry and the second transformer output signal is associated with a second load-line conversion ratio for the differential RF power amplifier circuitry, such that the first load-line conversion ratio is not equal to the second load-line conversion ratio.

17. Radio frequency (RF) circuitry comprising:
control circuitry configured to select one of a plurality of operating modes, which includes a first operating mode, a second operating mode, a third operating mode, and a fourth operating mode;
differential RF power amplifier circuitry configured to:
  receive and amplify a first differential RF input signal to provide a first differential RF output signal;
  receive and amplify a second differential RF input signal to provide a second differential RF output signal;
  receive and amplify a third differential RF input signal to provide a third differential RF output signal; and
  receive and amplify a fourth differential RF input signal to provide a fourth differential RF output signal; and
output transformer circuitry configured to receive and combine the first differential RF output signal, the second differential RF output signal, the third differential RF output signal, and the fourth differential RF output signal to provide a first transformer output signal, a second transformer output signal, a third transformer output signal, and a fourth transformer output signal, such that:
  during the first operating mode:
    the first transformer output signal is based on a combination of the first differential RF output signal, the second differential RF output signal, the third differential RF output signal, and the fourth transformer output signal that substantially reinforce one another;
    the second transformer output signal is based on a combination of the first differential RF output signal, the second differential RF output signal, the third differential RF output signal, and the fourth transformer output signal that substantially cancel one another;
    the third transformer output signal is based on a combination of the first differential RF output signal, the second differential RF output signal, the third differential RF output signal, and the fourth transformer output signal that substantially cancel one another; and
    the fourth transformer output signal is based on a combination of the first differential RF output signal, the second differential RF output signal, the third differential RF output signal, and the fourth transformer output signal that substantially cancel one another;
  during the second operating mode:
    the first transformer output signal is based on a combination of the first differential RF output signal, the second differential RF output signal, the third differential RF output signal, and the fourth transformer output signal that substantially cancel one another;
    the second transformer output signal is based on a combination of the first differential RF output signal, the second differential RF output signal, the third differential RF output signal, and the fourth transformer output signal that substantially reinforce one another;
    the third transformer output signal is based on a combination of the first differential RF output signal, the second differential RF output signal, the third differential RF output signal, and the fourth transformer output signal that substantially cancel one another; and
    the fourth transformer output signal is based on a combination of the first differential RF output signal, the second differential RF output signal, the third differential RF output signal, and the fourth transformer output signal that substantially cancel one another;
  during the third operating mode:
    the first transformer output signal is based on a combination of the first differential RF output signal, the second differential RF output signal, the third differential RF output signal, and the fourth transformer output signal that substantially cancel one another;
    the second transformer output signal is based on a combination of the first differential RF output signal, the second differential RF output signal, the third differential RF output signal, and the fourth transformer output signal that substantially cancel one another;
    the third transformer output signal is based on a combination of the first differential RF output signal, the second differential RF output signal, the third differential RF output signal, and the fourth transformer output signal that substantially reinforce one another; and
    the fourth transformer output signal is based on a combination of the first differential RF output signal, the second differential RF output signal, the third differential RF output signal, and the fourth transformer output signal that substantially cancel one another; and
  during the fourth operating mode:
    the first transformer output signal is based on a combination of the first differential RF output signal, the second differential RF output signal, the third differential RF output signal, and the fourth transformer output signal that substantially cancel one another;
    the second transformer output signal is based on a combination of the first differential RF output signal, the second differential RF output signal, the third differential RF output signal, and the fourth transformer output signal that substantially cancel one another;
    the third transformer output signal is based on a combination of the first differential RF output signal, the second differential RF output signal, the third differential RF output signal, and the fourth transformer output signal that substantially cancel one another; and the fourth transformer output signal is based on a combination of the first differential RF output signal, the second differential RF output signal, the third differential RF output signal, and the fourth transformer output signal that substantially reinforce one another.

18. The RF circuitry of claim 17 wherein:
the first transformer output signal is a first full duplex transmit signal;
the second transformer output signal is a first half duplex transmit signal;
the third transformer output signal is a second half duplex transmit signal; and
the fourth transformer output signal is a second full duplex transmit signal.

19. The RF circuitry of claim 18 wherein:
the first full duplex transmit signal and the first half duplex transmit signal are highband transmit signals; and
the first full duplex transmit signal and the first half duplex transmit signal are lowband transmit signals.

20. The RF circuitry of claim 17 further comprising input transformer circuitry configured to receive and split a transformer input signal, such that the first differential RF input signal, the second differential RF input signal, the third differential RF input signal, and the fourth differential RF input signal are based on the split transformer input signal, wherein the transformer input signal is de-multiplexed to provide the first transformer output signal, the second transformer output signal, the third transformer output signal, and the fourth transformer output signal.

21. A method comprising:
selecting one of a plurality of operating modes, which includes a first operating mode and a second operating mode;
receiving and amplifying a first differential radio frequency (RF) input signal to provide a first differential RF output signal;
receiving and amplifying a second differential RF input signal to provide a second differential RF output signal;
providing output transformer circuitry; and
receiving and combining the first differential RF output signal and the second differential RF output signal to provide a first transformer output signal and a second transformer output signal, such that:
during the first operating mode, the first transformer output signal is based on a combination of the first differential RF output signal and the second differential RF output signal that substantially reinforce one another, and the second transformer output signal is based on a combination of the first differential RF output signal and the second differential RF output signal that substantially cancel one another; and
during the second operating mode, the first transformer output signal is based on a combination of the first differential RF output signal and the second differential RF output signal that substantially cancel one another, and the second transformer output signal is based on a combination of the first differential RF output signal and the second differential RF output signal that substantially reinforce one another.

* * * * *